Figure 1:
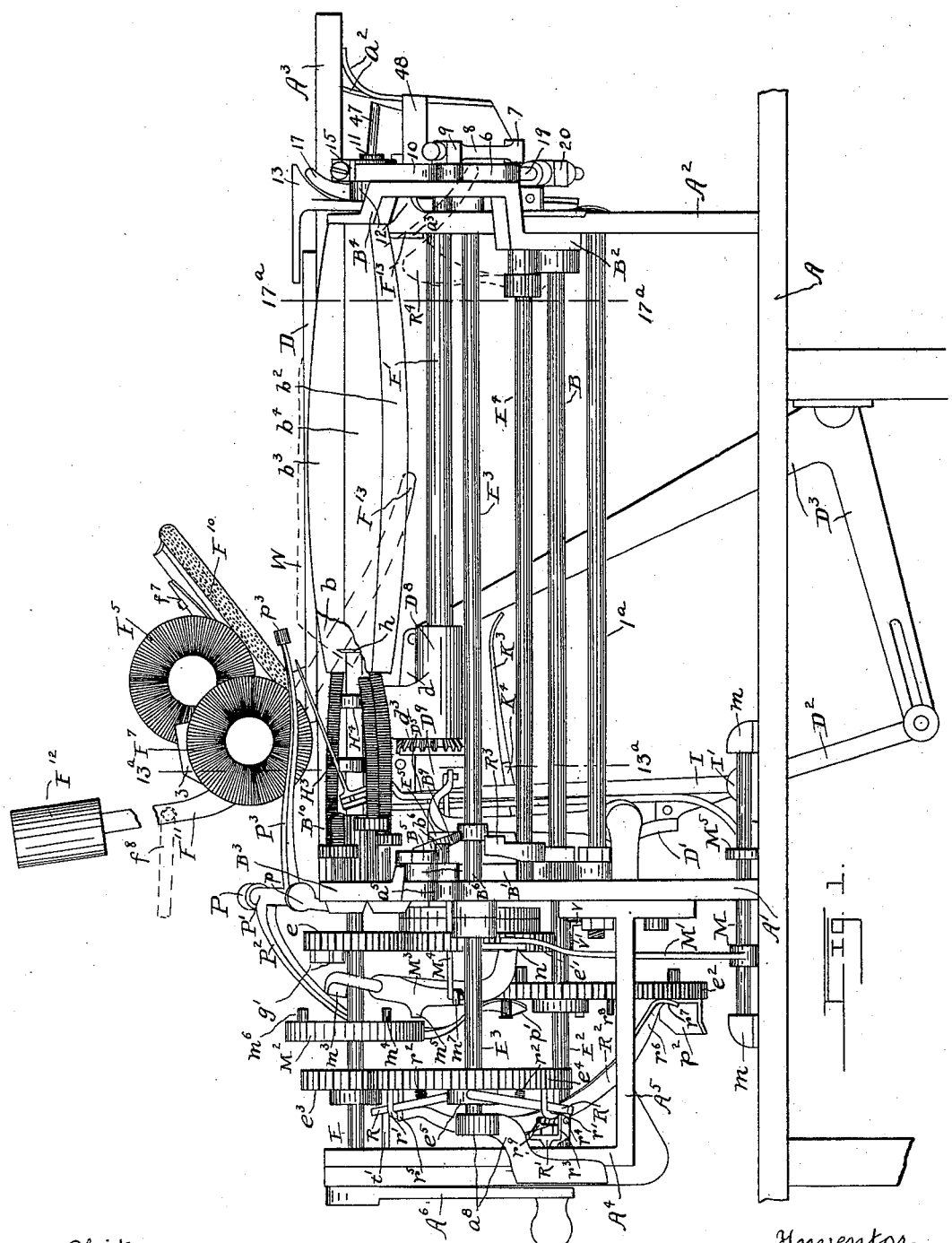

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 1.

Witnesses:
W. M. Hall.
C. G. Bassler

Inventor
Thomas H. Keller.
Benjamin H. Snavely.
By Attorney
Wm. R. Gerhart

No. 617,366.   Patented Jan. 10, 1899.
B. H. SNAVELY & T. H. KELLER.
CIGAR MACHINE.
(Application filed Jan. 19, 1897.)
(No Model.)   14 Sheets—Sheet 4.

Witnesses:
W. M. Hall.
C. G. Bassler

Inventor
Thomas H. Keller.
Benjamin H. Snavely.
By Attorney
Wm. R. Gerhard

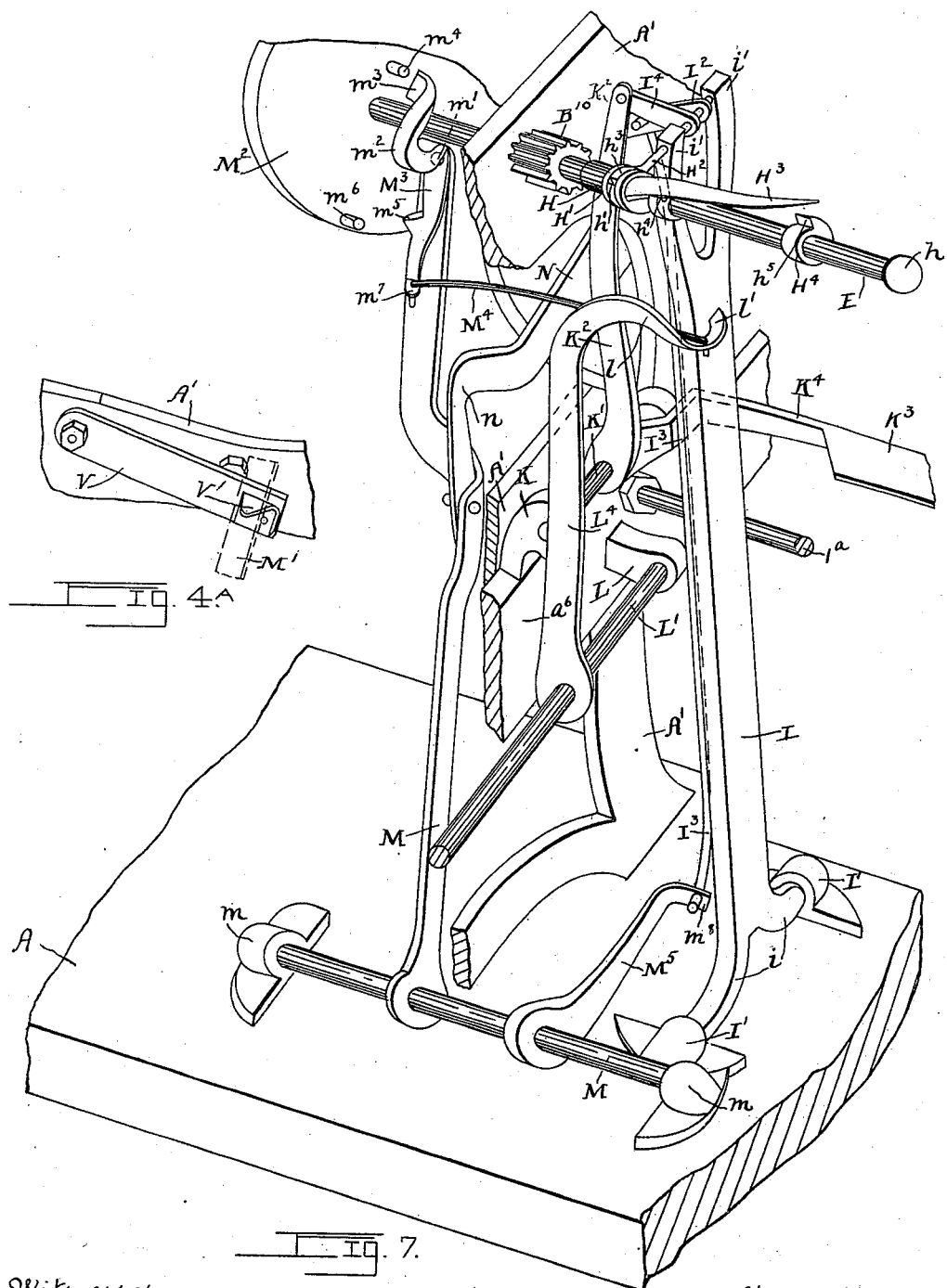

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 6.

Witnesses:
W. M. Hall.
C. G. Bassler

Inventor
Thomas H. Keller.
Benjamin H. Snavely.
By Attorney
Wm. R. Gerhart

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 7.
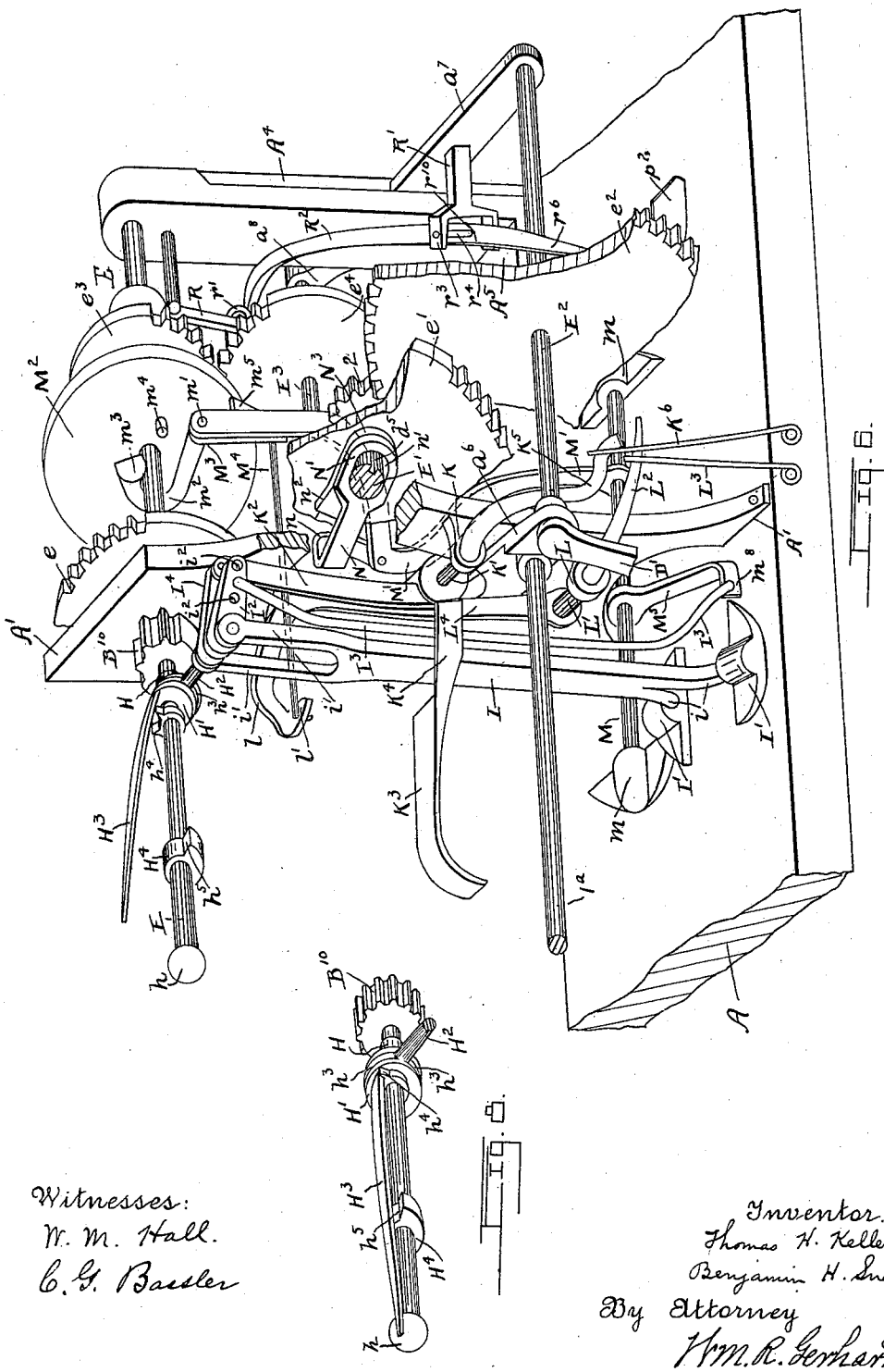

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 8.
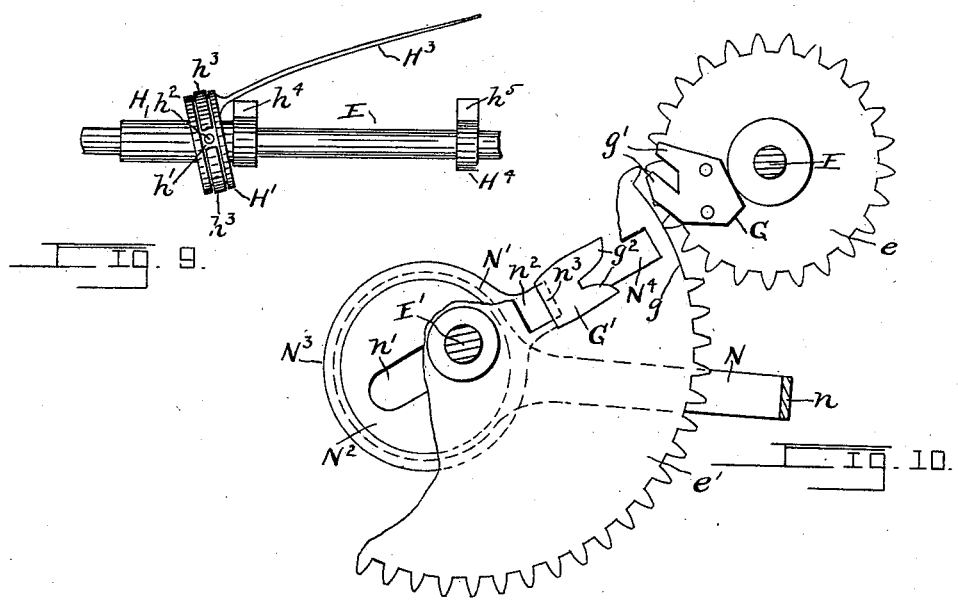
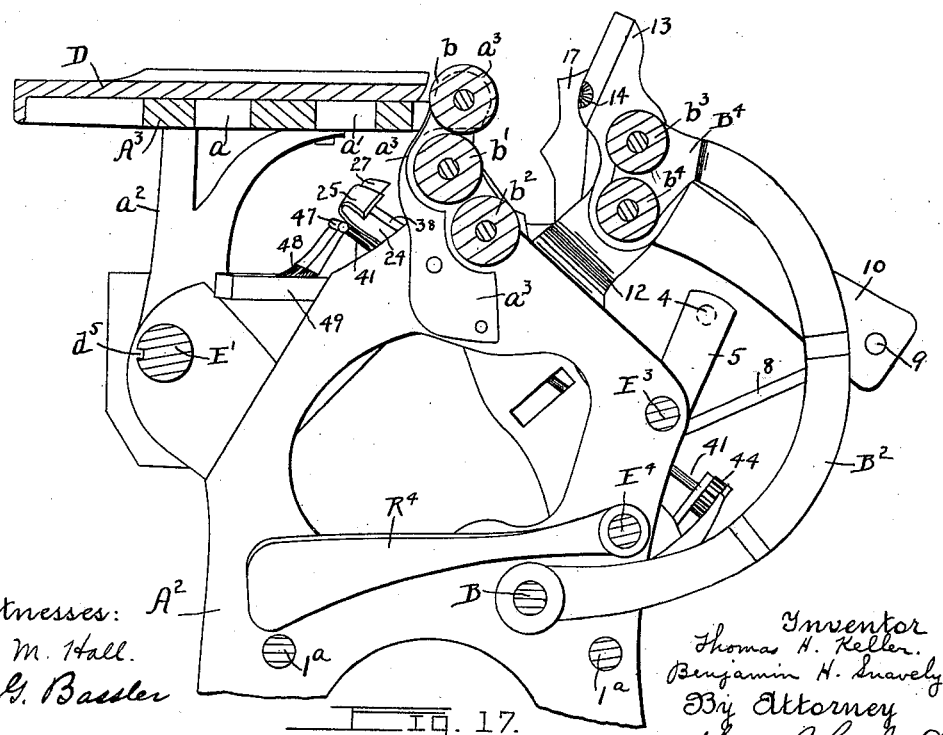

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 9.
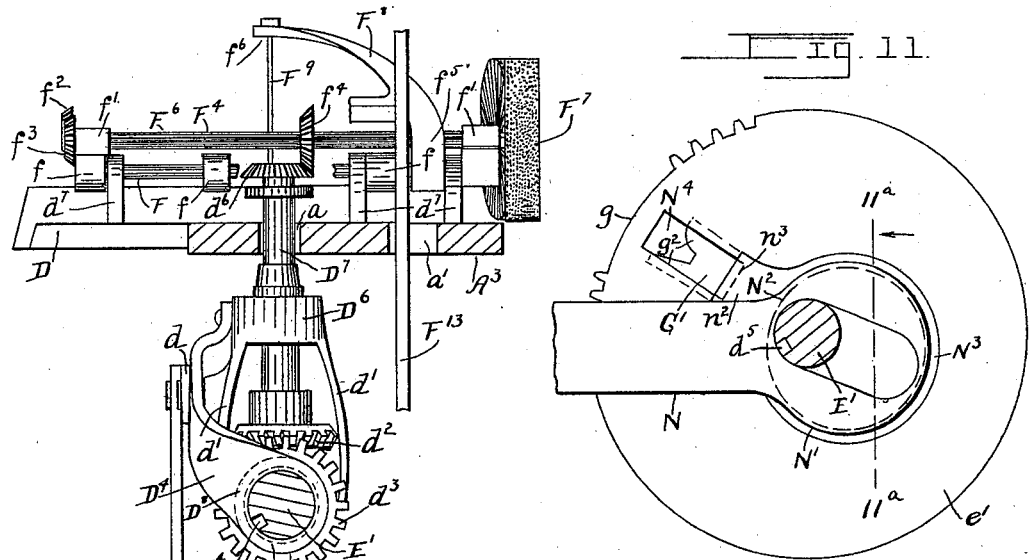
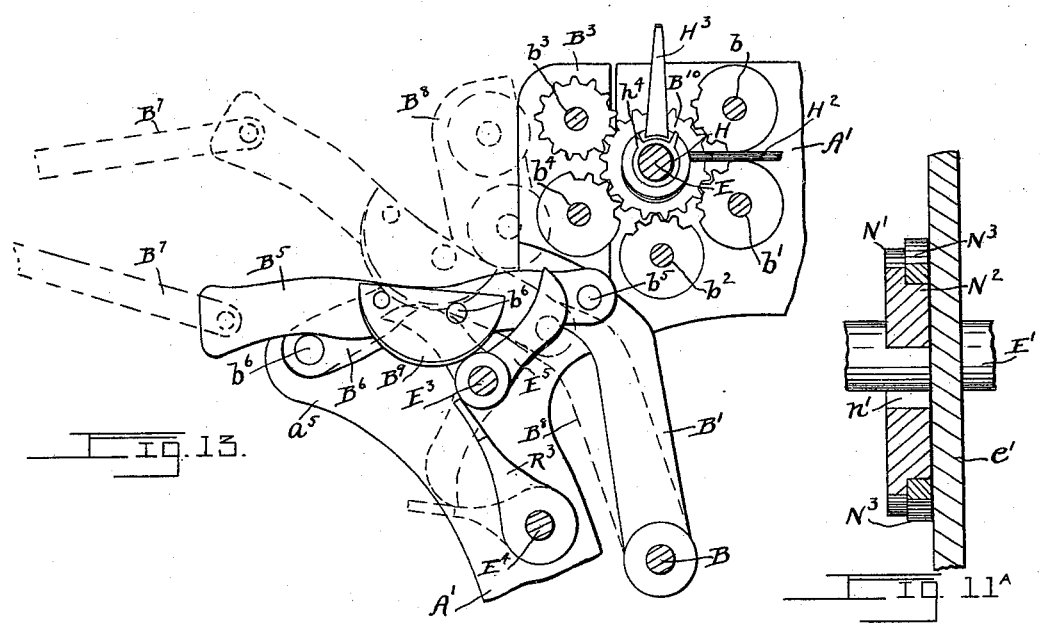
Witnesses:
W. M. Hall.
C. G. Bassler
Inventor
Thomas H. Keller.
Benjamin H. Snavely.
By Attorney
Wm. R. Gerhart

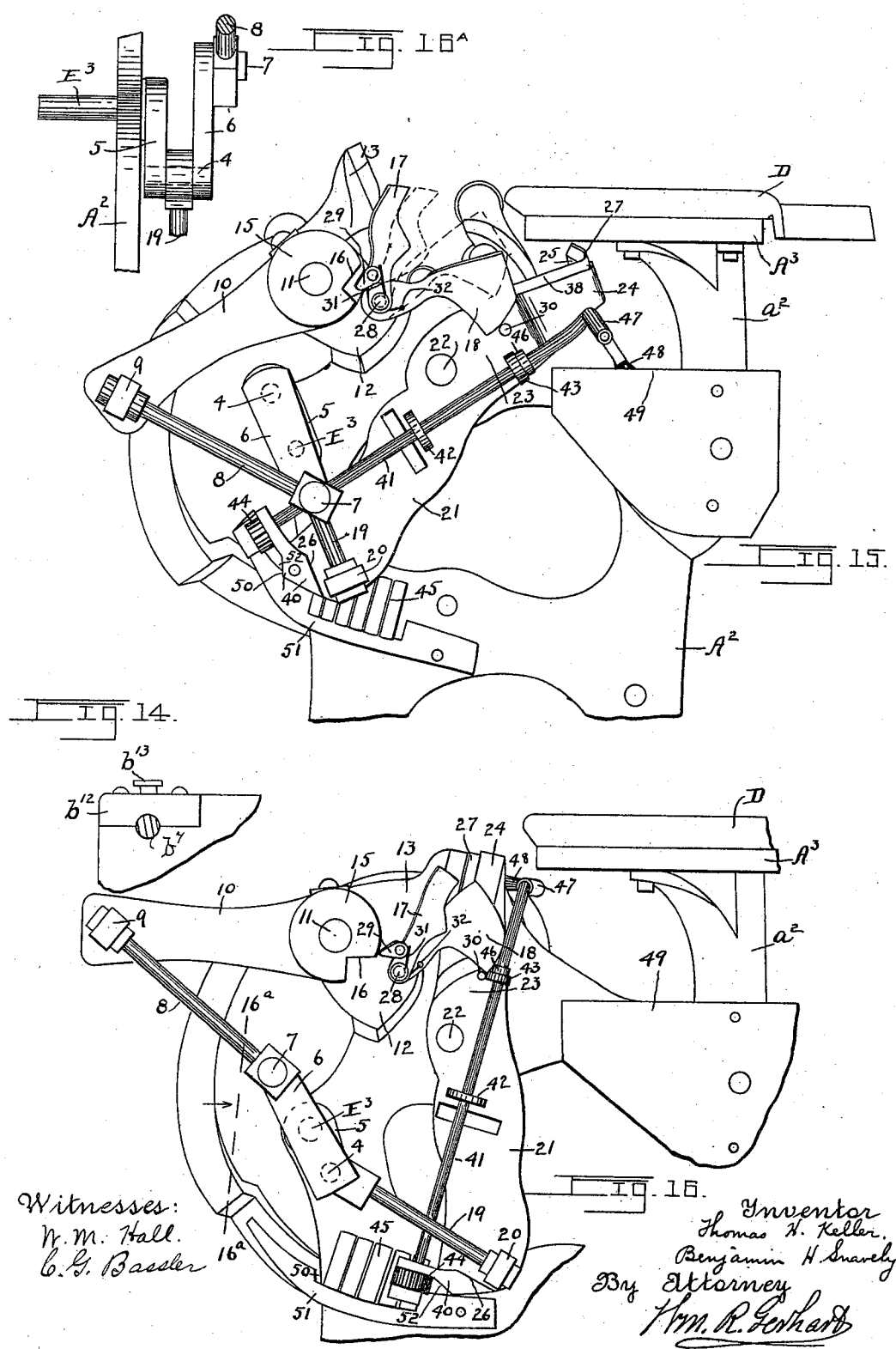

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 11.
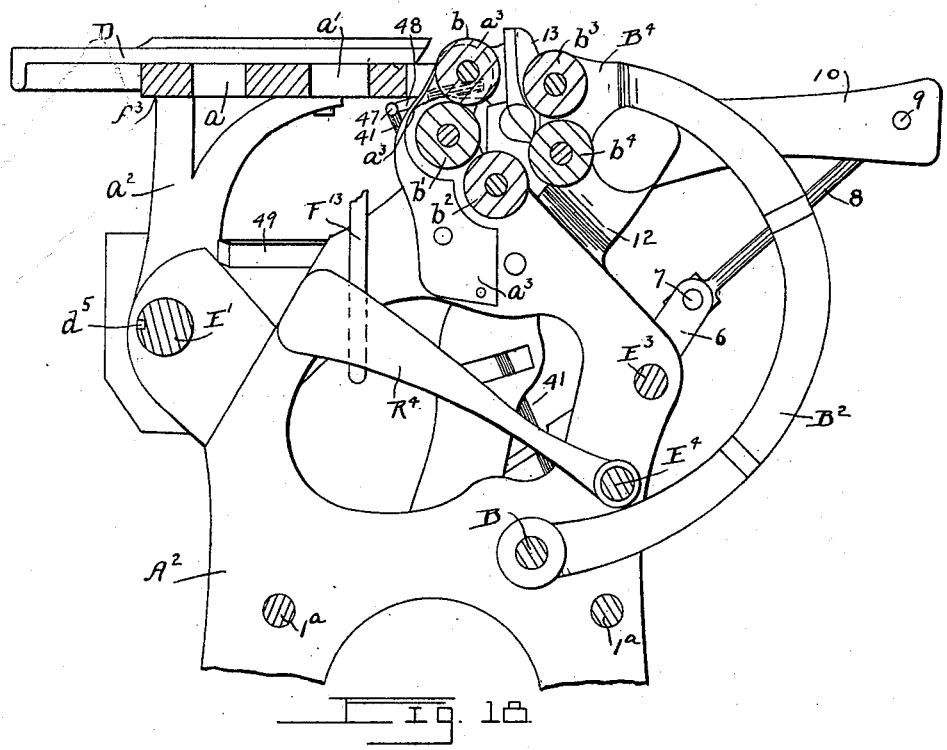
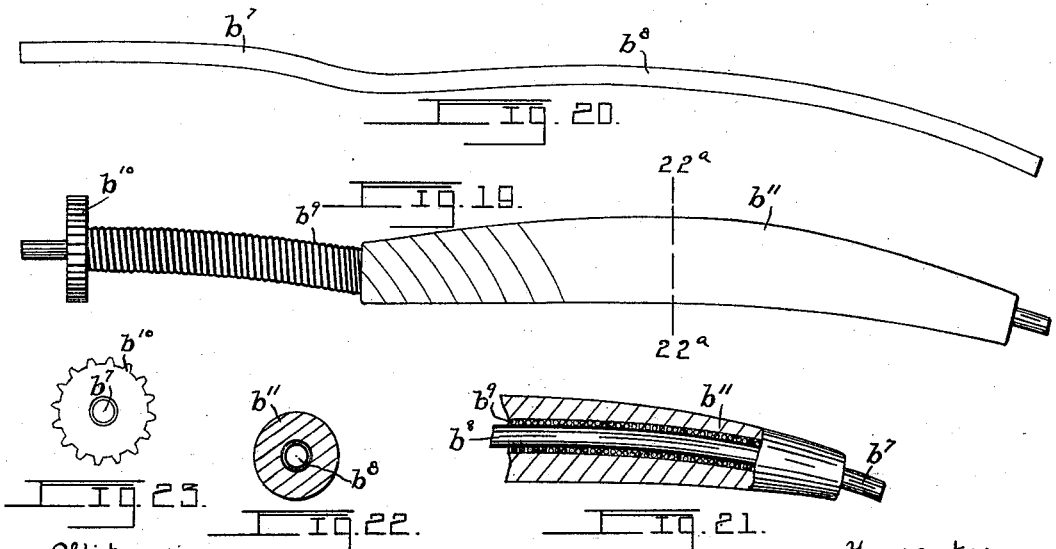

No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 12.
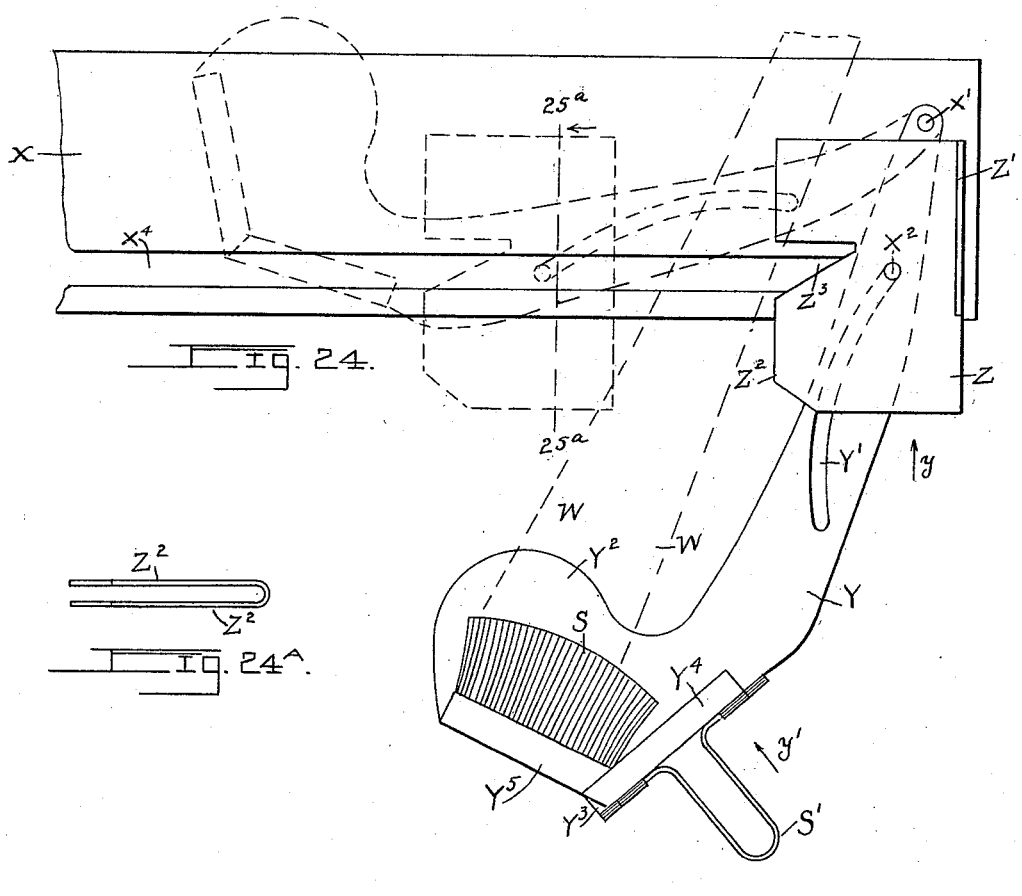
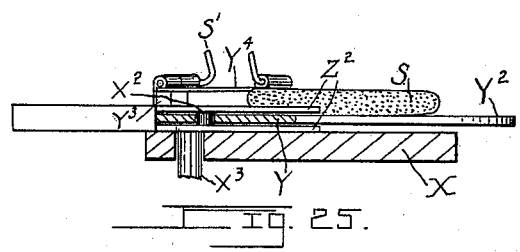
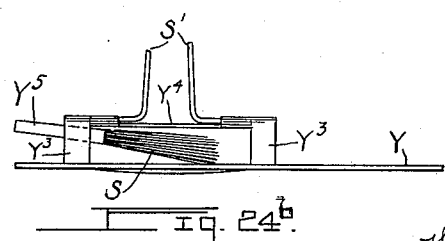
Witnesses:
W. M. Hall.
C. G. Bassler.
Inventor
Thomas H. Keller.
Benjamin H. Snavely.
By Attorney
Wm. R. Gerhart No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 13.
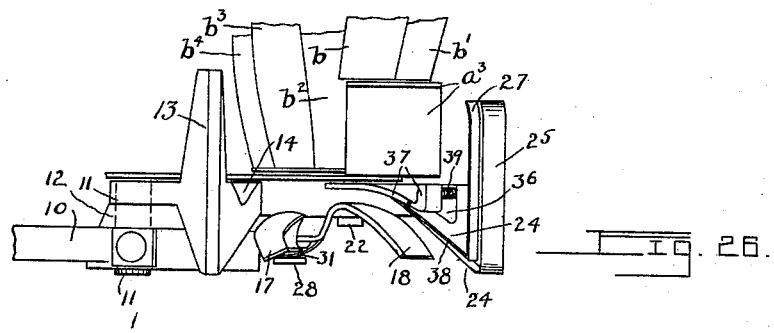
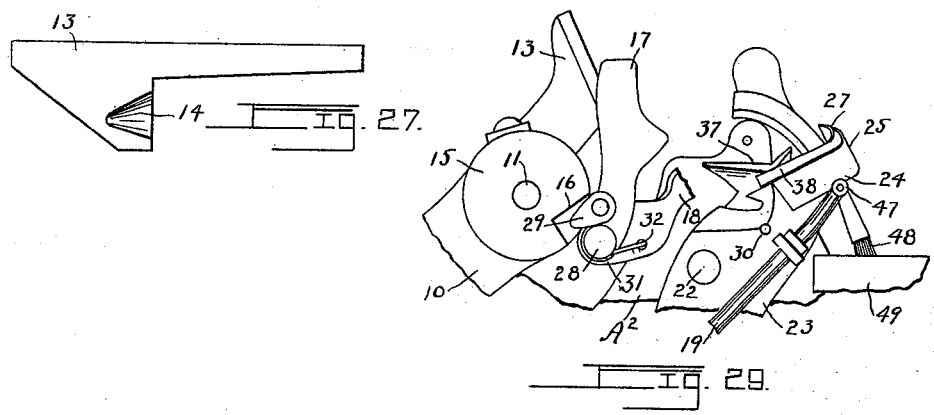
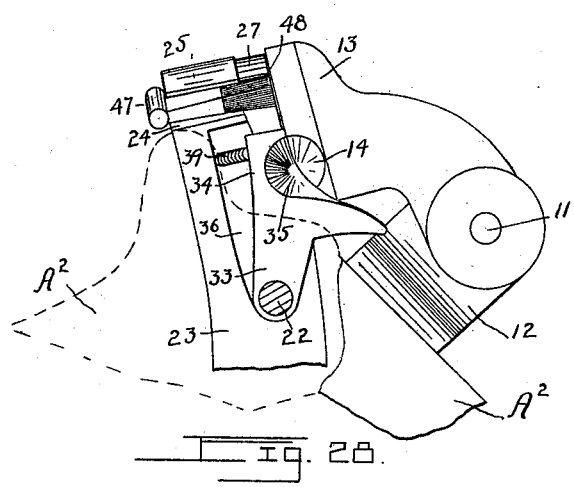
Witnesses:
W. M. Hall.
C. G. Bassler
Inventor
Thomas H. Keller.
Benjamin H. Snavely
By Attorney
Wm. R. Gerhart No. 617,366. Patented Jan. 10, 1899.
B. H. SNAVELY & T. H. KELLER.
CIGAR MACHINE.
(Application filed Jan. 19, 1897.)
(No Model.) 14 Sheets—Sheet 14.

Witnesses:
W. M. Hall.
C. G. Bassler.

Inventor.
Thomas H. Keller.
Benjamin H. Snavely.
By Attorney
Wm. R. Gerhart.

UNITED STATES PATENT OFFICE.

BENJAMIN H. SNAVELY, OF BRUNNERVILLE, AND THOMAS H. KELLER, OF LITITZ, PENNSYLVANIA.

CIGAR-MACHINE.

SPECIFICATION forming part of Letters Patent No. 617,366, dated January 10, 1899.

Application filed January 19, 1897. Serial No. 619,817. (No model.)

*To all whom it may concern:*

Be it known that we, BENJAMIN H. SNAVELY, residing at Brunnerville, and THOMAS H. KELLER, residing at Lititz, in the county of Lancaster and State of Pennsylvania, citizens of the United States, have invented certain Improvements in Cigar-Machines, of which the following is a specification.

This invention relates to improvements in that class of cigar-machines designed more particularly for rolling the wrappers around bunches or around fillers; and the objects of our improvements are, first, to automatically apply the wrapper and to shape the cigar; second, to automatically spread the wrapper as it is fed between the rolls; third, to automatically hold the tuck end of the cigar in place as the rolling of the wrapper about the bunch or the filler begins; fourth, to automatically sever the surplus portion of the wrapper from the tuck of the cigar; fifth, to automatically apply paste for securing the head end of the wrapper on the cigar; sixth, to automatically shape the head of the cigar; seventh, to automatically sever the surplus from the head end of the wrapper, and, eighth, to automatically hold the wrapper while the head of the cigar is being finished and while the surplus of the head of the wrapper is being severed from the cigar.

Our invention consists in a cigar-machine provided with mechanism for accomplishing these objects, as hereinafter fully described, and then pointed out in the claims.

Our invention is illustrated in the accompanying drawings, forming a part of this specification, in which—

Figure 2:
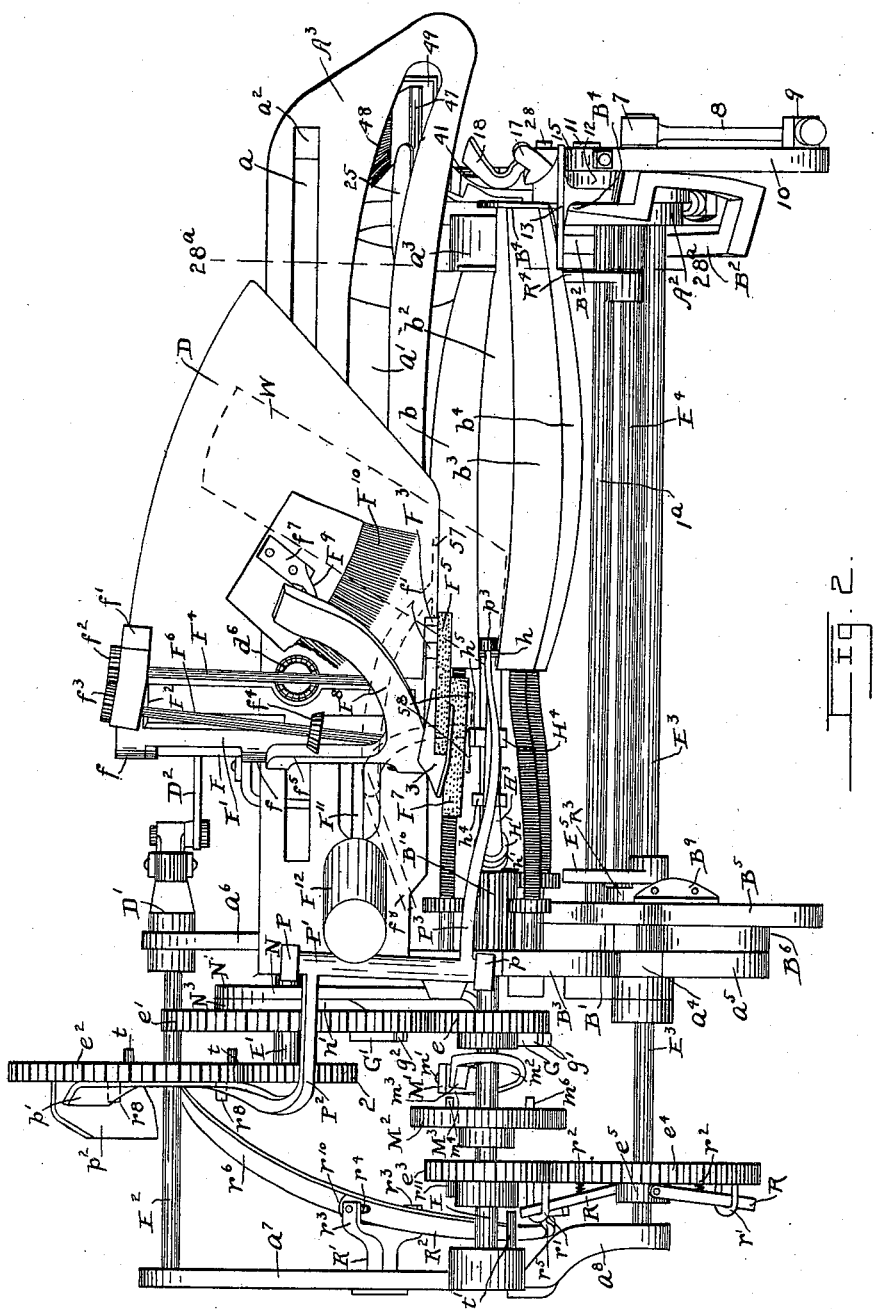
Figure 3:
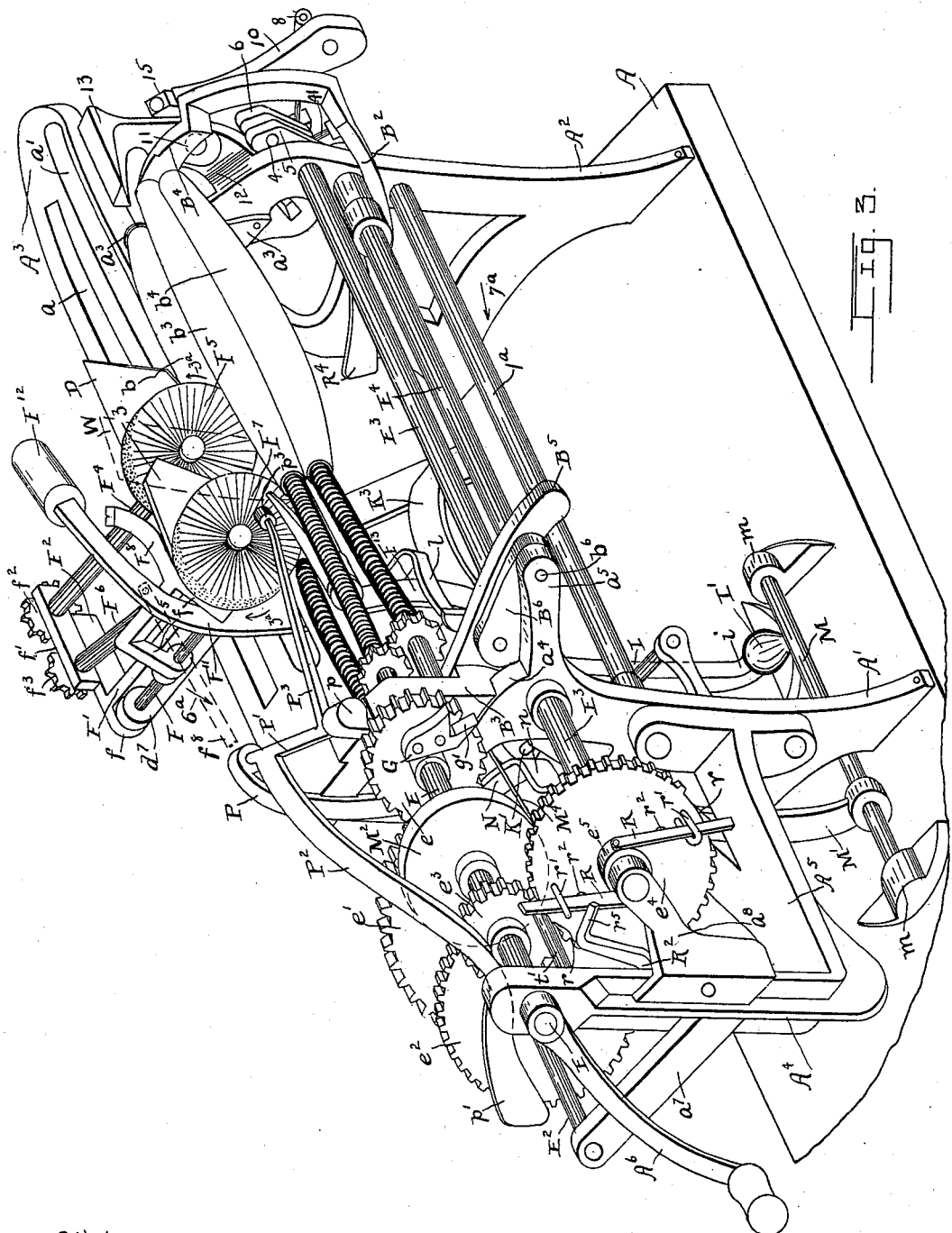
Figure 4:
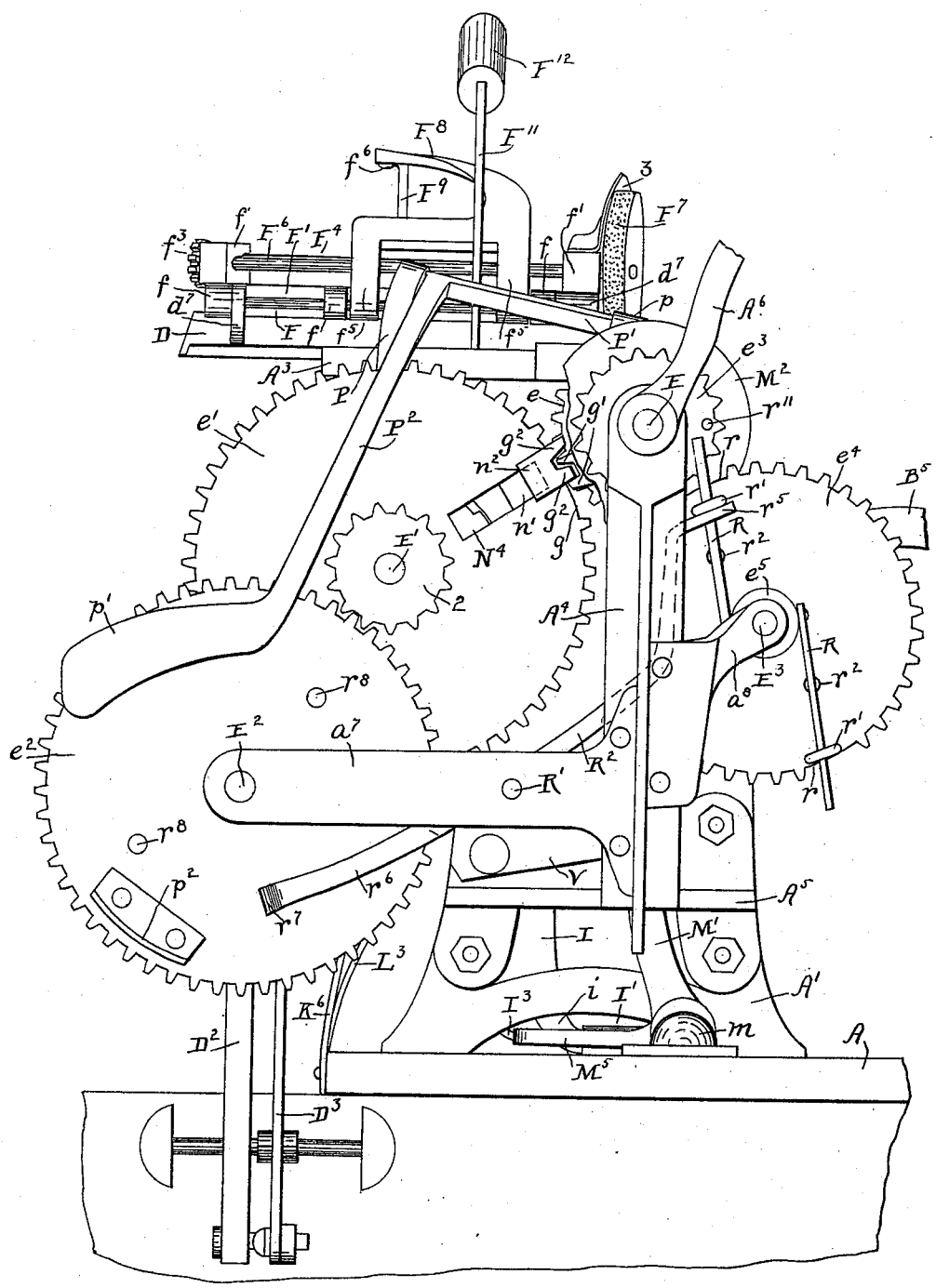
Figure 5:
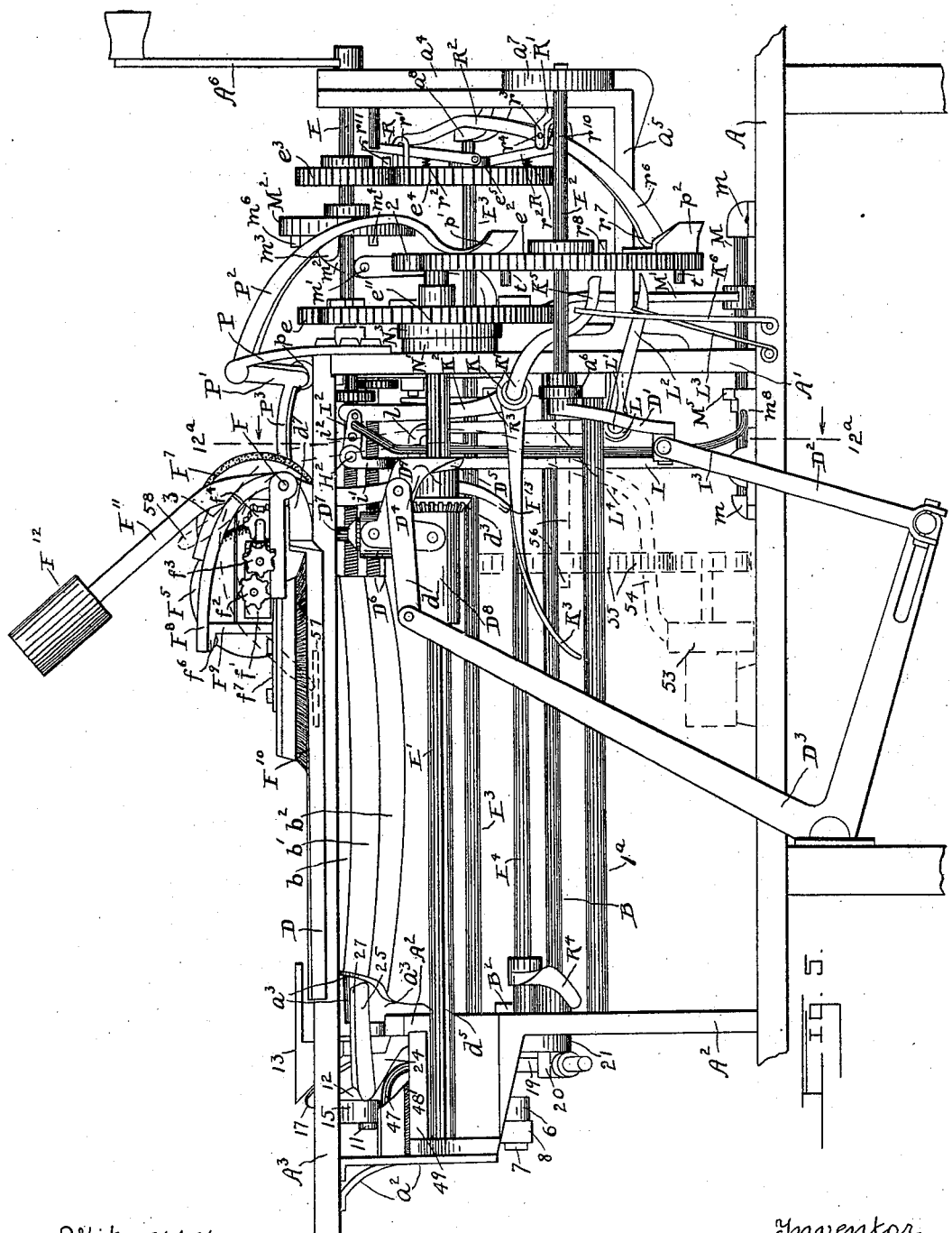

Figure 1 is an elevation of the front of a machine embodying our improvements, the various parts being shown in the positions occupied thereby when a wrapper is to be put in place to be rolled around the filling of a cigar, parts being cut away; and Fig. 2, a top plan view showing the parts of the machine in the same position, a portion of the wrapper-spreading brush being cut away. Fig. 3 is front perspective view of the machine, the various parts being shown in the position occupied thereby after a wrapper is secured in position to be rolled about the filling of a cigar; Fig. 4, an elevation of the end of the machine to which the power is applied; Fig. $4^a$, Sheet 7, a perspective view of spring-plate V; Fig. 5, a rear elevation of the machine; Fig. 6, a rear perspective view, taken from the direction of arrow $6^a$, Fig. 3, of the mechanism actuating the finger securing the tuck end of the wrapper in place as the rolling of the same around the filling begins; and Fig. 7, a front perspective view of the same mechanism, taken from the direction of arrow $7^a$, Fig. 3. Fig. 6 shows the finger and the parts actuating the same in the positions occupied thereby when a wrapper is to be put in place, and Fig. 7 the same parts in the positions they occupy after the spreading-brush has been engaged with the wrapper. Fig. 8, Sheet 6, is a detached perspective view of the finger and the portion of the driving-shaft to which it is attached, said finger being shown in the position occupied thereby when holding down the tuck of a wrapper; and Fig. 9, Sheet 10, an enlarged side view of the finger and of the sleeve to which it is attached. Fig. 10, Sheet 10, is an outside elevation of the gear actuating the shaft through which motion is communicated to the reciprocating table; Fig. 11, Sheet 8, an inside elevation of a portion of said gear; Fig. $11^a$, a vertical section on broken line $11^a$ $11^a$ of Fig. 11; and Fig. 12, a vertical section on broken line $12^a$ $12^a$ of Fig. 5, showing the gear through which said shaft actuates the reciprocating table. Fig. 13 is a section on broken line $13^a$ $13^a$ of Fig. 1, showing the gear through which the rollers are actuated; and Fig. 14, Sheet 9, a vertical section of one of the shafts of said gear, showing a device for removably securing the shaping-cores of the rollers to the frame of the machine. Fig. 15 is an outside elevation of that end of the machine at which the wrapping of the head of the cigar is finished, the parts being shown in the position occupied thereby before the wrapping begins; Fig. 16, a similar view, but showing the position occupied by the same parts after the head of the cigar is finished; Fig. $16^a$, a side view on broken line $16^a$ $16^a$ of Fig. 16, showing the double crank through which said parts are actuated; Fig. 17, Sheet 10, a view of the same parts occupying the position shown in Fig.

15, but taken on broken line $17^a$ $17^a$ of Fig. 1; and Fig. 18, Sheet 11, a similar view on said broken line $17^a$ $17^a$, but showing the parts in the position they occupy as the head of the cigar is finished. Fig. 19 is an enlarged side view of one of the rollers detached from the machine; Fig. 20, a similar view of the core or shaper of the roller; Fig. 21, a view of a portion of one of the rollers, partially in section; Fig. 22, a vertical section on broken line $22^a$ $22^a$ of Fig. 19, and Fig. 23 an end elevation of the geared end of a roller. Fig. 24, Sheet 12, is a top view of a modification of the mechanism for feeding the wrapper to the rollers; Fig. 25, a section thereof on broken line $25^a$ $25^a$ of Fig. 24; Fig. $24^a$, a side view of the sleeve, seen from the direction of arrow $y$; and Fig. $24^b$, a rear view of the brush and its support, seen from the direction of arrow $y'$. Fig. 26, Sheet 13, is a top view of the parts for holding and cutting away the surplus of the head ends of the wrappers, showing the same in an open position; Fig. 27, a face view of the section of the headformer that registers with that carried by the stock of the knife; Fig. 28, a vertical section on broken line $28^a$ $28^a$ of Fig. 2, showing the knife closed and the sections of the headformer united; and Fig. 29, an enlarged outer face view of the mechanism for holding and cutting off the head end of the wrapper while the head of the cigar is being completed. Fig. 30, Sheet 14, is a top plan view of a portion of the machine, showing the location of the blower-tube in full lines; and Fig. 31, a rear view showing an elevation of the blower, its operating mechanism, and the tube.

Similar letters and numerals indicate like parts throughout the several views.

Referring to the details of the drawings, A indicates the bed-plate of the machine; A', a standard supporting the end of the machine to which the power is applied; $A^2$, a standard supporting the end of the machine at which the head of the cigar is formed, and $A^3$ a platform having slots $a$ and $a'$ longitudinally thereof and supported on the rear portion of standard A' and in bracket $a^2$, projecting outward from standard $A^2$.

In front of platform $A^3$ are arranged three rollers parallel therewith and one above the other. The uppermost of these rollers, $b$, is located at about the height of said platform or somewhat higher and is supported in standard A' and in a bracket $a^3$, projecting inward from standard $A^2$. The other two rollers, $b'$ and $b^2$, respectively, are longer than roller $b$ and are directly supported by both of said standards A' $A^2$. The said three rollers are so disposed as to form the inner and bottom portions of a longitudinal pocket in which the bunch or the fillers are placed to have the wrapper applied thereto. Beneath roller $b^2$ is a rockshaft B, journaled in the standards, and on the end of said shaft and adjacent to the inner face of standard A' is an arm B', extending diagonally upward and having a head $B^3$ on the free end thereof, offset so as to take over a lower section $a^4$ of standard A'. On the other end of rock-shaft B is a second arm $B^2$, located adjacent to standard $A^2$ and curving outward and upward, whereby the head $B^4$ thereon is located opposite head $B^3$, and in these heads are supported, one above the other, two rollers $b^3$ and $b^4$, respectively, so disposed as to complete the formation of said pocket when said arms are closed toward platform $A^3$, as will be explained. When rollers $b^3 b^4$ are opened out from rollers $b$, $b'$, and $b^2$, so as to discharge a completed cigar, they are again restored to their normal positions through a lever $B^5$, having one end pivoted to arm B' at $b^5$ and fulcrumed to the vibrating end of a link $B^6$, pivoted at $b^6$ to an outwardly-extending bracket $a^5$ of standard A'. Pivot $b^6$ forms a rest or stop for lever $B^5$ when the outer end of said lever is lowered to close rollers $b^3$ and $b^4$ upon the other rollers. The construction just described is shown in Fig. 3 of Sheet 3 and in Fig. 13 of Sheet 8. Lever $B^5$ may be actuated by hand or automatically through a connecting-rod $B^7$, actuated from a machine (not shown) operating in unison with this machine and which feeds the fillers or the bunches to the pocket formed by the rollers and while rollers $b^3$ and $b^4$ are in an open position. In Fig. 13 the parts are shown in a closed position in full lines and in a partially-closed position by broken lines $B^8$. When in a closed position, rollers $b^3$ and $b^4$ are opened out from rollers $b$, $b'$, and $b^2$ by the engagement of an arm on one of the shafts with the under side of a shoulder $B^9$ on lever $B^5$, as will be explained.

Each roller, Figs. 19 to 23, both inclusive, Sheet 11, has a rigid rod $b^7$, that serves as a core and a shaper for the outer parts of the roller, and the ends of this rod are rigidly secured in said arm-heads $B^3$ and $B^4$ or in bracket $a^3$, the part $b^8$ of said rod, on which is formed the roller proper, being bent to a shape corresponding with that which it is desired to give the cigar. Removably placed on said rod is a sleeve $b^9$, constructed of coiled wire and having rigidly secured on the end adjacent to head $B^3$ a pinion $b^{10}$, meshing with a gear-wheel to be described. The portion of sleeve $b^9$ embracing the forming part $b^8$ of the roller is covered by a jacket $b^{11}$, of rubber or other elastic material, rigidly secured thereto. In the general figures of the drawings rod $b^7$ is shown as rigidly secured in its bearings; but in practice these rods are removably secured in said heads, as shown in Fig. 14, Sheet 9. One of said rods is illustrated in this figure as removably secured in a head by a cap-plate $b^{12}$ and a clamp-screw $b^{13}$; but it may be so secured in any other well-known manner. When in operation, the shaping-core $b^7$ of each roller is rigidly held in its bearings, while sleeve $b^9$ and jacket $b^{11}$ are revolved around said shaping-core through pinion $b^{10}$.

On platform $A^3$ is a reciprocating table D, which moves thereon longitudinally of the rollers. This reciprocating table D is actuated through a driving-shaft E, Figs. 2, 3, and 4, a pinion $e$ on said driving-shaft, a gear-wheel $e'$ on a shaft $E'$, a pinion 2 on said shaft $E'$, a gear-wheel $e^2$ on a shaft $E^2$, journaled in an arm $a^6$ of standard $A'$ and in an arm $a^7$ of a post $A^4$ on a bracket of said standard, a crank $D'$, Fig. 5, on shaft $E^2$, a connecting-rod $D^2$, and a bell-crank lever $D^3$, connected with a link $d$, pivoted to a plate $D^4$, Fig. 12, Sheet 8, uniting a collar $D^5$ on shaft $E'$ with the journal-bearing $D^6$ of a vertical shaft $D^7$, said vertical shaft extending up through slot $a$ of platform $A^3$ and being connected with said reciprocating table, as will be described.

For the purposes of this specification the end of the machine toward which the tuck end of the cigar is formed will be termed the "tuck" end and that at which the head of the cigar is formed the "head" end. An examination of Fig. 5, Sheet 5, will show that the upward movement of crank $D'$ shifts reciprocating table D from the tuck end of the machine toward the head end thereof and the downward movement from the head end toward the tuck end of said machine.

The support of journal-bearing $D^6$, Fig. 12, Sheet 8, is bifurcated, and each of the jaws $d'$ formed by the bifurcation is rigidly connected with the sleeve $D^8$, embracing shaft $E'$. Vertical shaft $D^7$ passes through bearing $D^6$ and has its lower end journaled in a socket (not shown) in the top of sleeve $D^8$. On said lower end of vertical shaft $D^7$ is a bevel-pinion $d^2$, which meshes with a bevel-gear $d^3$ on a revoluble sleeve $D^9$ on shaft $E'$, and located between collar $D^5$ and sleeve $D^8$ and on the inside of revoluble sleeve $D^9$ is a stud $d^4$, that engages a longitudinal groove $d^5$ in shaft $E'$. Through stud $d^4$ and groove $d^5$ rotary motion is communicated to sleeve $D^9$, bevel-gear $d^3$, pinion $d^2$, and vertical shaft $D^7$, the upper end of which passes through a bearing in reciprocating table D and has a bevel-gear $d^6$ on the extremity thereof and resting on said table. As motion is transmitted to both crank $D'$ and vertical shaft $D^7$ through gearing on shaft $E'$, said vertical shaft is actuated whenever motion is imparted to reciprocating table D.

On the end of reciprocating table D toward the tuck end of the machine are arms $d^7$, Figs. 3 and 4 and Fig. 12 of Sheet 8, wherein is journaled the hinge-rod F of a frame carrying a flat brush for holding and spreading the cigar-wrapper as it is drawn between the rollers and circular brushes for deflecting the wrapper between said rollers and further spreading the same. Said frame has a horizontal bar $F'$, disposed parallel with hinge-rod F, and on said horizontal bar are lugs $f$, wherein the hinge-rod F is secured. On the side of horizontal bar $F'$ opposite lugs $f$ are formed arms $F^2$ $F^3$, Fig. 2. In bearings $f'$ on the ends of arms $F^2$ $F^3$ is journaled an approximately horizontal shaft $F^4$, having on the front end, outside of the adjacent arm $F^3$, a circular brush $F^5$ and on the opposite end, outside of arm $F^2$, a gear-wheel $f^2$, and below shaft $F^4$ is a shaft $F^6$, having on the end journaled in arm $F^2$ a gear-wheel $f^3$, that meshes with gear-wheel $f^2$. From arm $F^2$ shaft $F^6$ is inclined downward and carries on the extremity of the end journaled in arm $F^3$ and outside of brush $F^5$ a circular brush $F^7$. Where brushes $F^5$ and $F^7$ lap each other, they are separated by a vertical plate 3, secured to arm $F^3$ and which prevents interference between said brushes. On shaft $F^6$ is a bevel-gear $f^4$, adapted to mesh with bevel-gear $d^6$ of vertical shaft $D^7$ when said gear-wheel $f^4$ is in an operative position, as shown in Fig. 12 of Sheet 8. Extending over shaft $F^4$ is a curved arm $F^8$, having jaws $f^5$ formed on its lower end, through which it is hinged on hinge-rod F. The upper end of said arm $F^8$ extends beyond shaft $F^4$ and has secured thereto the lip $f^6$ of a depending rod $F^9$, to a tongue $f^7$ on the lower end whereof is adjustably secured a horizontally-disposed brush $F^{10}$, (see Fig. 30,) which when the parts are in an operating position presses the wrapper upon reciprocating table D and spreads the same as it is drawn into the pocket formed by rollers $b$ $b^4$. Rigidly secured on hinge-rod F is a lever, (see Figs. 1, 3, and 5,) one arm $F^{11}$ whereof extends upward and toward shafts $F^6$ and $F^4$ and which has on its free end a weight $F^{12}$. The other arm $F^{13}$ of said lever extends downward through slot $a'$ of platform $A^3$ and serves to actuate parts of the mechanism hereinafter to be described. It is also through this lever-arm $F^{13}$ (see Fig. 3) that the brush-carrying frame is thrown up to permit a wrapper to be placed on the reciprocating table to be drawn between said rollers, as will be explained. In operating, the brush-carrying frame being raised so as to uncover the reciprocating table and the whole length of the entrance to the pocket formed by said rollers $b$ $b^4$, as seen in Figs. 1 and 2, the wrapper is put in place on said table, as shown by broken lines W of said figures, with the tuck end of the same covering the tuck end of the bunch or the fillers in said pocket, and then the wrapper is secured in position by lowering the brush-carrying frame, so that the brushes thereon secure said wrapper in place. As the wrapper is drawn into said pocket brush $F^{10}$ holds the same, so that it maintains the proper direction as it passes from the reciprocating table, while brushes $F^5$ $F^7$ properly deflect the wrapper into the roller-pocket. The brush-carrying frame is lowered into an operating position by hand by grasping weight $F^{12}$, or it may be lowered automatically through a rod (illustrated by broken lines $f^8$, Figs. 1, 2, and 3) connected with coöperating mechanism. Horizontally-disposed brush $F^{10}$ is pivoted to its support so that it may be properly adjusted horizontally.

Driving-shaft E is journaled in post $A^4$ of a bracket $A^5$, secured to the outer face of standard $A'$, and in said standard, power being applied to the outer end of said shaft either through a hand-crank $A^6$ or by means of a pulley and belt. (Not shown.) That time may be allowed the attendant to place a fresh wrapper on reciprocating table D before the same begins its movement from the tuck end of the roller-pocket toward the head end thereof the connection between pinion $e$ of driving-shaft E and gear-wheel $e'$ of shaft $E'$ is broken. This is accomplished by constructing gear-wheel $e'$ with a toothless segment $g$, Fig. 4, whereby said pinion and gear-wheel are thrown out of gear when segment $g$ reaches the point at which the teeth of said pinion and gear-wheel mesh, unless other connection between the same is established, as will be described. On the face of pinion $e$ is rigidly secured a plate G, Fig. 3, having jaws $g'$, adapted to interlock with jaws $g^2$, Figs. 4, 10, and 11, of a radially-reciprocating head $G'$ on the outer face of gear-wheel $e'$. With the completion of the movement of the reciprocating table D from the head to the tuck end of the machine toothless segment $g$ of gear-wheel $e'$ is at the point at which engagement between the teeth of said pinion and those of said gear-wheel is made, and head $G'$, Fig. 10 of Sheet 10, is in such retracted position that the jaws $g^2$ thereof cannot be engaged by jaws $g'$ of pinion $e$, so that no movement can be transmitted from that pinion to gear-wheel $e'$.

Driving-shaft E extends through standard $A'$ to and between the tuck ends of rollers $b$ $b^4$, and on the extremity of said extended end of driving-shaft E is formed a cutting disk or blade $h$, Figs. 6, 7, and 8. On said shaft, adjacent to standard $A'$, is an elongated gear-wheel $B^{10}$, adapted to mesh with the pinions $b^{10}$ on sleeves $b^9$ of the rollers $b$ $b^4$, and inside of said gear-wheel $B^{10}$ is a reciprocating sleeve H, embracing said shaft E, Fig. 8, Sheet 6, and Fig. 9, Sheet 10, the sleeve H having thereon a collar $H'$, provided with an annular groove $h'$, through which said collar is pivoted on opposite sides to sleeve H by pins $h^2$, so that collar $H'$ can be given an angular movement on said sleeve with reference to the periphery thereof about pins $h^2$, the collar being sufficiently large to allow such angular movement on the sleeve. In groove $h'$ of collar $H'$ are loosely engaged the jaws $h^3$ of a rock-shaft $H^2$, to be described, and attached to the front of collar $H'$ is a finger $H^3$, to which movement is imparted by the angular movement of said collar and which holds the tuck end of the wrapper in place when the rolling of the same about the filling of the cigar is begun. Inside of collar $H'$ two ears $h^4$ are formed on the end of sleeve H, between which the said finger is engaged when depressed, and on driving-shaft E, inside of the limit of the inward movement of sleeve H, a collar $H^4$ is rigidly secured, whereon is a shoulder $h^5$, also adapted to be engaged by finger $H^3$ when depressed, whereby when so depressed rotary motion is imparted to said finger, the sleeve H, and the collar $H'$ within the jaws $h^3$.

The mechanisms through which are actuated reciprocating head $G'$, carrying jaws $g^2$ on gear-wheel $e'$, and the finger $H^3$ are intimately connected and will be described together. These mechanisms are illustrated more particularly in Fig. 5 of Sheet 5, Fig. 6 of Sheet 6, and Fig. 7 of Sheet 7. Inside of standard $A'$ is a rocking post I, having on its lower end feet $i$, journaled in bearings $I'$ on bed-plate A. The head or upper end of post I is bifurcated, and in the jaws $i'$ thus formed is journaled rock-shaft $H^2$, through which sleeve H and finger $H^3$ are actuated. In bearings K on the inner face of standard $A'$ is journaled a rock-shaft $K'$, having rigidly keyed thereon an upwardly-extending arm $K^2$, pivoted to an outwardly-projecting arm $I^4$, rigidly attached to the rock-shaft $H^2$, and from said rock-shaft $K'$ is rigidly supported an inwardly-extending lip $K^3$, located back of the inner face of post I and connected with rock-shaft $K'$ by a stem $K^4$, passing around one side of said post I. This lip $K^3$, having its free end curved downward, is adapted to be engaged by lever-arm $F^{13}$, secured to hinge-rod F of the brush-frame, when said frame is lowered from an open to an operative position, whereby the head of post I is moved inward, carrying sleeve H toward cutting-disk $h$ on the inner end of driving-shaft E, at the same time somewhat lowering the free end of finger $H^3$, as shown in Figs. 3 and 7. The rear end of rock-shaft $K'$ is curved outward beyond the outer face of standard $A'$, and its extremity $K^5$ is bent downward and outward to form a shoulder engaged by the upper end of a vertical spring-rod $K^6$, whereby said rock-shaft $K'$ is prevented from being accidentally moved from the position in which it is placed by the positive action of the mechanism through which it is actuated. The lower end of spring-rod $K^6$ is attached to bed-plate A.

Below rock-shaft $K'$ in bearings L on the inner face of standard $A'$ is also journaled a rock-shaft $L'$, likewise having its rear end $L^2$ curved and bent in the same manner as is the outer end $K^5$ of rock-shaft $K'$, the shoulder formed by the extremity of said end of rock-shaft $L'$ being engaged by the upper end of a spring-rod $L^3$ and for the same purpose. On rock-shaft $L'$ on the outer side of rocking post I is rigidly secured an upwardly-extending arm $L^4$, having on its upper end an inwardly and rearwardly bent extension $l$, the extremity $l'$ whereof is turned toward the inner face of rocking post I and in the path of movement thereof when said post is rocked inward, whereby the upper end of said arm $L^4$ is actuated in the same direction with rocking post I. Parallel with driving-shaft E and outside of rocking post I is a rock-shaft M, Figs. 1, 6, and 7, journaled in bearings $m$ on bed-plate A, and keyed to said rock-shaft M, outside of standard A', is a rock-bar M', that extends up between pinion $e$ and a pin-wheel $M^2$, keyed on driving-shaft E. At $m'$ a lever $M^3$ is fulcrumed to the upper end of said rock-bar M'. The upper arm of this lever extends above driving-shaft E and is bent so as to form a bight $m^2$ therein, whereby the end of said upper arm is adapted to play transversely above driving-shaft E. On the end of said upper arm is an outwardly-extending lip $m^3$, adapted to be interposed in the path of travel of a horizontal pin $m^4$ on the inner face of pin-wheel $m^2$, and on the lower arm of lever $M^3$ is also an outwardly-extending lip $m^5$, adapted to be moved into the path of travel of another pin $m^6$ on said pin-wheel. The extremity of the lower arm of lever $M^3$ is provided with a perforated lip $m^7$, through which perforation and a similar perforation in the bent extension $l$ arm $L^4$ is connected with said lever $M^3$ by a rod $M^4$. To rock-bar M' is also pivoted a curved extension $n$ of a rod N, Figs. 6 and 10, and Fig. 11, Sheet 8, passing behind gear-wheel $e'$ and connecting said bar with the mechanism to be described, whereby reciprocating head G' is drawn out to the periphery of said gear-wheel $e'$ in position for the jaws $g^2$ thereon to be engaged by jaws $g'$ of pinion $e$. On rock-shaft M, inside of standard A', Fig. 6, is a rearwardly-extending arm $M^5$, having a perforated lip $m^8$ on the vibrating end thereof. Through this perforation and one of a series of perforations $i^2$ through an arm $I^2$, rigidly secured to rock-shaft $H^2$, arm $M^5$ is connected with said arm $I^2$ by a rod $I^3$.

In operating, when the brush-frame is lowered to place the brushes carried thereby in their normal positions arm $F^{13}$ of said brush-frame engages and depresses lip $K^3$ of rock-shaft K', (see Fig. 5 of Sheet 5,) turning said rock-shaft K' and throwing arm $K^2$ inward, thus also moving the upper end of post I inward and the sleeve H in the same direction toward cutting-disk $h$, at the same time somewhat depressing finger $H^3$, as shown in Fig. 7. In its inward movement post I engages extremity $l'$ of arm $L^4$, drawing the lower arm of lever $M^3$ with it, whereby lip $m^3$ of the upper arm of said lever $M^3$ is forced toward the face of pin-wheel $M^2$ and in the path of travel of the pin $m^4$ thereon. The rotation of driving-shaft E engages said pin $m^4$ with said lip $m^3$, forcing rock-bar M' forward until said pin and lip are disengaged the one from the other. This movement of rock-bar M' also turns rock-shaft M, raises arm $M^5$, and through rod $I^3$, arm $I^2$, and rock-shaft $H^2$ depresses the free end of the finger until it bears upon cutting disk or blade $h$ of driving-shaft E, as shown in Fig. 8 of Sheet 6, the wrapper having previously been placed in proper position for being rolled around the cigar-filling and with the tuck end thereof lapping blade $h$, so that said finger secures the tuck end of the wrapper on said blade. Through connecting-rod N and intermediate mechanism, to be described, this movement of rock-bar M' draws reciprocating head G' outward in slot $N^4$ of gear-wheel $e'$ until the jaws $g^2$ thereon project sufficiently beyond the periphery to be engaged by jaws $g'$ of pinion $e$, as shown in Fig. 4.

In a post P, Figs. 1, 2, 3, and 4, and a lug $p$ on the tuck end of platform $A^3$ is journaled a rock-shaft P'. On the outside of this rock-shaft is formed a downwardly-extending arm $P^2$, having the free end $p'$ thereof broadened and adapted to be engaged by a curved rib $p^2$ on the outer face of gear-wheel $e^2$, whereby said arm is raised, and on the inside of rock-shaft P' is an inwardly-extending arm $P^3$, having on its free end the roller $p^3$, adapted to be pressed upon the edge of blade $h$ on the inner end of driving-shaft E when arm $P^2$ is raised, by which means the surplus of the tuck end of the wrapper is severed from the cigar.

The mechanism through which rod N connects bar M' of rock-shaft M and reciprocating head G' of gear-wheel $e'$ is illustrated in Figs. 4 and 10 and Figs. 11 and $11^a$ of Sheet 8. Said rod N has on its rear end a head N', on the inner face whereof is a boss $N^2$, of less diameter than said head, and which bears against the inner face of gear-wheel $e'$, the shaft E' passing through a slot $n'$ in said head N' and boss $N^2$. Boss $N^2$ is loosely engaged by a collar $N^3$, having thereon a lateral extension $n^2$, connected with said head G' by a shoulder $n^3$, passing through a radial slot $N^4$ in gear-wheel $e'$. When rock-bar M' is drawn forward by the engagement of lip $m^3$ of lever $M^3$ with pin $m^4$ of pin-wheel $M^2$, rod N is also drawn forward, carrying in the same direction the parts connected therewith, whereby jaws $g^2$ of reciprocating head G' are projected beyond the toothless segment $g$ of gear-wheel $e'$ at such time as to engage jaws $g'$ of pinion $e$, and when said rock-bar M' is again thrown back into its normal position said jaws $g^2$ are also retracted and are held out of range of jaws $g'$ of pinion $e$. Slot $n'$, through head N' of rod N and boss $N^2$, permits said head and boss to be moved transversely of shaft E', so that when the center of said head and boss is off of the center of shaft E' the boss $N^2$ forms a cam, through which and collar $N^3$ a reciprocating movement is imparted to head G'. The arrangement of parts is such that when the head N' is drawn forward the head G' is thrown toward the periphery of gear-wheel $e'$ in time for the jaws on said head to engage jaws $g'$ of pinion $e$.

The mechanism for finishing the head of the cigar is actuated through a pinion $e^3$ on driving-shaft E and a gear-wheel $e^4$ on a shaft $E^3$, journaled in a bracket $a^3$ on post $A^4$ and in standards A' and $A^2$, Figs. 1, 2, 3, and 4. This mechanism is called into action only when the head of a cigar is to be finished, and while the other parts of the machine are operating it remains inactive. We accomplish this result by imparting an intermittent movement to shaft E³. With this end in view two toothless segments r are formed nearly opposite each other in the periphery of gear-wheel $e^4$, and on opposite sides of hub $e^5$ of said gear-wheel are pivotally attached levers R, extending outward to and beyond segments r. Levers R pass through loops $r'$ secured to the face of gear-wheel E³ and adjacent to toothless segments r, in which loops said levers play toward and from the face of said gear-wheel, being normally held away from the gear-wheel by coiled springs $r^2$, seated in recesses in the face of gear-wheel E³ and bearing against the inner faces of levers R. In arm $a^7$ of post A⁴ is secured an inwardly-extending arm R', having on its inner end jaws $r^3$, in which is journaled an upwardly-inclined rock-shaft $r^4$, having formed thereon an inclined lever R², the front end whereof extends upward and has a lip $r^5$ thereon adapted to engage the outer faces of levers R. The rear arm $r^6$ of lever R² extends downwardly to the rear and has on the end thereof a beveled end $r^7$, adapted to be engaged by each of two studs $r^8$ on the outer face of gear-wheel $e^2$, said studs being located to one side of a diametrical line through said gear-wheel. Around rock-shaft $r^4$ is coiled a spring $r^9$, (shown in Fig. 1,) and the upper end $r^{10}$ of said spring passes around and bears upon the rear arm $r^6$ of lever R², as seen in Fig. 2, to maintain said lever R² at the proper degree of slope. When the mechanism that forms the head of the cigar is to remain inactive, the toothless segments r of gear-wheel $e^4$ are at the point of contact of the teeth of said gear-wheel and of pinion $e^3$; but as the head-forming mechanism is to be operated beveled end $r^7$ of inclined lever R² is engaged by one of the studs $r^8$, when lip $r^5$ of said lever is pressed inward against one of the levers R, forcing the same into the path of travel of a stud $r^{11}$ on the face of pinion $e^3$, whereby gear-wheel $e^4$ is rotated until the teeth of said pinion and gear-wheel mesh, actuating said head-forming mechanism in one direction until the other toothless segment r of gear-wheel $e^4$ is at the point of the intersection of the teeth of said gear-wheel and the pinion. When the other stud $r^8$ engages beveled end $r^7$ of the inclined lever R², the action of the gear-wheel and the pinion is repeated and the head-forming mechanism is actuated in the opposite direction, as will be described. In post A⁴ is a detent $t'$, that extends inward toward gear-wheel $e^4$ far enough to be engaged by levers R, when in their normal position, to stop the revolution of said gear-wheel at the proper time; but there is sufficient space between said detent and gear-wheel $e^4$ to permit said levers R to pass between them when pressed against the face of said gear-wheel by the lip of lever R².

Beneath shaft E³ and between it and rock-shaft B is a rock-shaft E⁴, having a lip R³ thereon adjacent to standard A' and a tripping-arm R⁴ adjacent to standard A² and which engages and raises the lower arm F¹³ at the beginning of the movement of reciprocating table D from the head end to the tuck end of platform A³. Said tripping-arm is actuated through the engagement of lip R³, Fig. 13 of Sheet 8, by an arm E⁵ on shaft E³, which arm also opens out the rollers $b^3$ and $b^4$ by engaging shoulder B⁹ on lever B⁵, as previously explained.

The mechanism for forming the heads of the cigars is actuated through shaft E³. For this mechanism see Figs. 15, 16, and 16ª, Sheet 9; Fig. 17, Sheet 10; Fig. 18, Sheet 11, and Figs. 26 and 29, Sheet 13. On said shaft is a double crank, Fig. 16ª, located outside of and adjacent to standard A². The wrist 4 of said crank is pivoted in the inner web 5 and rigidly secured in the outer web 6. On wrist 7 of the vibrating end of outer web 6 a connecting-rod 8 is pivoted and thence extends diagonally forward and upward and is pivoted in a wrist 9 on the vibrating end of a lever-arm 10, rigidly secured on a fulcrum 11, turning in the upright portion of an upwardly-curved bracket 12, extending outward from standard A², and on the inner end of said fulcrum 11 and on the inside of bracket 12 is formed a head 13, having in the inner face thereof a recess 14, that forms half the mold in which are shaped the heads of the cigars. In the head 15 of lever-arm 10 is a shoulder 16, through which is actuated one of the jaws 17 and 18, that grip the head end of the wrapper, as will be explained. On wrist 4 of the double crank is pivoted a connecting-rod 19, which extends downward and has its lower end pivoted in a wrist 20 on a lever-arm 21, which extends diagonally upward and rearwardly and is fulcrumed at 22 to standard A². The lever-arm 23, forming an extension of lever-arm 21, has on its outer end a head 24, extending outward from said standard and then inward over the same, said inward extension 25 being adapted to play over the bracket $a^3$ on said standard, and which supports the head end of roller $b$. In said head 24 is secured an angular blade 27, that severs the surplus of the head ends of the wrappers as the formation of the heads of the cigars is finished, as will be explained. On a stud 28 on bracket 12 are pivoted jaws 17 and 18, which close upon and hold the head end of the wrapper while the final turn of the cigar is being made and until the surplus of the head end of said wrapper is severed by angular blade 27. Jaw 17 is closed toward jaw 18 by the pressure of shoulder 16 of head 15 on a cam 29, rigidly secured to said jaw and extending downward and forward beneath said shoulder 16, while jaw 18 is closed toward jaw 17 by the pressure on the back thereof of a pin 30 on lever-arm 23. These jaws are opened by the tension of a spring 31, wound around stud 28, and having one end engaging the back of cam 29 on jaw 17 and the other end engaging a perforation 32 in jaw 18. On fulcrum 22 and inside of lever-arm 23 (Fig.

28, Sheet 13,) is pivoted the stem 33 of a head 34, in which is a recess 35, the counterpart of recess 14. Stem 33 and head 34 play in a recess 36 in the inner faces of lever-arm 23 and head 24, and on head 34 are an outwardly-extending lip and shoulder 37, (Figs. 26 and 29, Sheet 13,) in rear of which shoulder and beneath said lip extends an end 38 of angular blade 27, whereby is limited the forward play of head 34, actuated by a coiled spring 39, bearing on the back of said head and on the bottom of recess 36. On the extremity of lever-arm 21 an arm 40 is secured by a screw-bolt. (Figs. 15 and 16, Sheet 9.) The bearing of arm 40 on lever-arm 21 is elongated and engages a shoulder 26 on said lever-arm, whereby rotary movement of arm 40 is prevented. Arm 40 extends forward and upward, and a rock-shaft 41 passes through an aperture therein and through bearings 42 and 43 on the faces of the lever-arm 21 and 23, respectively. To the lower end of rock-shaft 41 and below arm 40 is keyed a pinion 44, which engages a rack 45 in the face of standard $A^2$. Longitudinal movement of rock-shaft 41 is prevented by said pinion and by a boss 46 on said shaft above bearing 43. On the upper end of this rock-shaft is an arm 47, formed at approximately right angles therewith, and attached to said arm is an elongated paste-brush 48. A paste-box 49 is supported below head 24 by standard $A^2$ and by bracket $a^3$ of said platform. Paste-brush 48 plays between the top of bracket $a^3$ and the horizontal portion of angular blade 27, as shown by broken lines in Fig. 18, Sheet 11. The forward movement of pinion 44, and consequently the movement of lever 21 and 23, with the parts connected with the head thereof, is limited by the engagement of a shoulder 50 of a guide-bar 51, attached to standard $A^2$, with a shoulder 52 on arm 40.

In operating, the parts of the machine being in the position shown in Figs. 1 and 2, and the bunch or fillers being in the roller-pocket, with the tuck end thereof resting against the head formed on the extremity of driving-shaft E by the cutting disk or blade $h$, a wrapper (shown by broken lines W) is placed on reciprocating table D, with one end between rollers $b$ and $b^3$ and resting over blade $h$. The brush-frame is then lowered, with brush $F^{10}$ pressing the leaf down on said reciprocating table and brushes $F^5$ $F^7$ forcing the same into the roller-pocket. With the lowering of the brush-frame arm $F^{13}$ engages lip $K^3$ of rock-shaft K', depressing the same and through said rock-shaft and the arm $K^2$ forcing the upper end of rocking post I away from standard A', thereby pushing inward reciprocating sleeve H and partially lowering finger $H^3$, at the same time engaging said rocking post I with the extremity $l'$ of arm $L^4$ and through rod $M^4$ and lever $M^3$ forcing lip $m^3$ on said lever $M^3$ into the path of travel of pin $m^4$ of pin-wheel $M^2$. Power being applied to driving-shaft E, pin $m^4$ engages lip $m^3$ and forces forward rock-bar M', drawing head G' toward the periphery of gear-wheel $e^2$, with jaws $g^2$ in position to be engaged by jaws $g'$ of pinion $e$, at the same time raising the outer end of arm $M^5$ of rock-shaft M and lowering finger $H^3$ through rod $I^3$, arm $I^2$, rock-shaft $H^2$, and collar H' of sleeve H, so that said finger presses down the tuck end of the wrapper and holds the same firmly on blade $h$. When finger $H^3$ is lowered, as described, it takes in front of shoulder $h^5$ of collar $H^4$, rigidly secured to driving-shaft E, and is thereby revolved with that shaft and blade $h$, thus maintaining a fixed hold on the tuck end of the wrapper. In its rotary movement said finger carries with it collar H', which revolves in jaws $h^3$ of rock-shaft $H^2$. When rock-bar M' is forced forward, it takes behind a beveled shoulder V' on a spring-plate V, having the rear end thereof secured to the outer face of a cross-bar of standard A', as shown in Fig. $4^a$. The application of the power to driving-shaft E continuing, jaws $g'$ of pinion $e$ engage jaws $g^2$ of gear-wheel $e'$, thus moving the reciprocating table from the tuck end toward the head end of the machine through the agencies before described. With the movement of said reciprocating table brushes $F^5$ $F^7$, through the gearing connecting them with shaft E', are revolved in opposite directions, as shown by arrows $3^a$ in Fig. 3, thus spreading the wrapper outward from the center thereof. After the reciprocating table has proceeded far enough to roll the wrapper sufficiently to bind the tuck end thereof in place one of the studs $t$ on the inner face of gear-wheel $e^2$ engages and depresses the curved rear end $K^5$ of rock-shaft K', thereby through arm $K^2$ drawing the upper end of rocking post I and the sleeve H back into their normal positions and also raising lip $K^3$ into position to be again engaged by arm $F^{13}$. After these results are accomplished the other stud $t$ on the inner face of gear-wheel $e^2$ engages and depresses the curved rear end $L^2$ of rock-shaft L'. This action returns rock-shaft L' to its normal position, draws arm $L^4$ toward post A', retracts the upper end of lever $M^3$ with lip $m^3$ through the movement of arm $L^4$ and connecting-rod $M^4$, and throws lip $m^5$ on the lower end of lever $M^3$ into the path of travel of stud $m^6$ on pin-wheel $M^2$. The engagement of stud $m^6$ with lip $m^5$ forces rock-bar M' backward over the beveled portion of shoulder V' of spring-plate V and into engagement with the end or point thereof, as shown in Fig. $4^A$, Sheet 7, pulls back head G' of gear-wheel $e'$ through rod N, boss $N^2$, collar $N^3$, and the connection between said collar and head G', at the same time depressing the vibrating end of lever $M^5$ and through connecting-rod $I^3$, arm $I^2$, and rock-shaft $H^2$ raising the free end of finger $H^3$ into position to be again closed down on the tuck end of a wrapper. After finger $H^3$ has been retracted through the movement of collar H' the broadened end $p'$ of the downwardly-extending arm $P^2$ of rock-shaft P' engages curved rib $p^2$ of gear-wheel $e^2$, thus depressing arm $P^3$ of said rock-shaft, so that roller $p^5$ presses the projecting end of the tuck of the wrapper upon the edge of blade $h$, whereby said projecting end of the tuck is severed from the cigar. Upon the completion of the movements just described and as the reciprocating table reaches the head end of the machine the beveled end $r^7$ of the rear arm $r^6$ of inclined lever $R^2$ is engaged by one of the studs $r^8$ on the front face of gear-wheel $e^2$, thus forcing the lip $r^5$ of the upper end of said lever inward against the adjacent lever R, pressing the same into the path of travel of the stud $r^{11}$ on the outer face of the pinion $e^3$, whereby the teeth of said pinion and those of gear-wheel $e^4$ are engaged, imparting motion to shaft $E^3$. Shaft $E^3$, through double crank 5 6, Figs. 15 to 18, Sheets 9, 10, and 11, and Figs. 26 to 29, Sheet 13, connecting-rod 8 and lever-arm 10, and connecting-rod 19 and lever-arm 21 23, closes jaws 17 and 18 upon the head end of the wrapper between the head of the cigar and a portion of said wrapper still pressed upon the reciprocating table by brush $F^{10}$ and closes blade 27 38 against the inner face of the head 13 of lever 10, severing the head end of the wrapper to be rolled about the cigar from the portion thereof grasped by jaws 17 and 18. In the order of their movements jaws 17 and 18 grasp the wrapper and hold it while a complete wrap thereof is made around the tip of the head of the cigar before blade 27 38 acts, the paste-brush 48 being brought into contact with the inner surface of the wrapper somewhat before the action of blade 27 38 and as jaws 17 and 18 hold said wrapper while the final twist thereof is made around the tip of the cigar. As will be understood, the actions of these parts follow each other in rapid succession—the grasp of the wrapper by jaws 17 and 18, the engagement of brush 48 with the inner face of the wrapper, and the severing of the surplus of said wrapper from the cigar by blade 27 38. The brush 48 is turned into position to engage the wrapper by the turning of rock-shaft 41, caused by the movement of pinion 44 over rack 45 as lever-arm 21 is moved backward. As the severing of the head end of the wrapper is completed the arm $E^5$ of shaft $E^3$, Fig. 13, Sheet 8, engages and depresses the lip $R^3$ on rock-shaft $E^4$, thereby raising tripping-arm $R^4$ on said rock-shaft in front of arm $F^{13}$, Fig. 18, Sheet 11. As this is done the downward movement of the crank $D'$ on shaft $E^2$ begins the movement of reciprocating table D toward the tuck end of the machine, when said lever-arm $F^{13}$ engages the raised tripping-arm $R^4$ and is thrown upward and backward, thus again raising the brush-frame into the position shown in Fig. 1, when said arm $E^5$ of shaft $E^3$ clears lip $R^3$ of rock-shaft $E^4$, allowing tripping-arm $R^4$ to resume its normal position, which it does by reason of its own weight. As this is done one of the toothless segments $r$ of gear-wheel $e^4$ reaches the point of engagement between the teeth of said gear-wheel and those of pinion $e^3$, further movement of said gear-wheel being stopped by the contact of the arm R adjacent to said toothless segment with the detent $t$ on post $a^4$, Figs. 1 and 3. As reciprocating table D approaches the limit of its movement toward the tuck end of the machine the beveled end $r^7$ of the rear arm $r^6$ of inclined lever $r^2$ is again engaged by one of the studs $r^8$ on the front face of gear-wheel $e$, the lever R in contact with detent $t'$ is forced inward into the path of travel of the stud $r^{11}$ on the outer face of the pinion $e^3$, and motion is again communicated to shaft $E^3$, whereby through double crank 5 6 the blade 27 38 and the jaws 17 and 18 are again opened out and the paste-brush 48 is turned back into paste-box 49. While these movements are being carried out, arm $E^5$ on shaft $E^3$ engages beneath the shoulder $B^9$ of the lever $B^5$ (see broken lines in Fig. 13, Sheet 8) and raises the outer end of said lever, thus turning arms $B'$ and $B^2$ outward and swinging rollers $b^3$ and $b^4$ away from rollers $b$, $b'$, and $b^2$, allowing the finished cigar to drop into a chute (not shown) beneath said roller-pocket, as is common. During the retraction of reciprocating table D the rolling of the cigar continues, and the binding of the head end of the wrapper on the head of the cigar in forming-recess 14 35 is assured. To resume operations, the rollers $b^3$ and $b^4$ are closed upon the rollers $b$, $b'$, and $b^2$ by lowering the outer end of the lever $B^5$ by hand, or this is done automatically through a rod $b^7$, (shown in broken lines in Fig. 13, Sheet 8,) connected with a bunching-machine for feeding bunches into the roller-pocket. So, too, after a wrapper is put in place the brush-frame will be automatically lowered through a rod $f^8$, pivoted to weight-lever arm $F^{11}$, as shown in Figs. 1, 2, and 3, and connected with said bunching-machine.

Figures 31, 50:
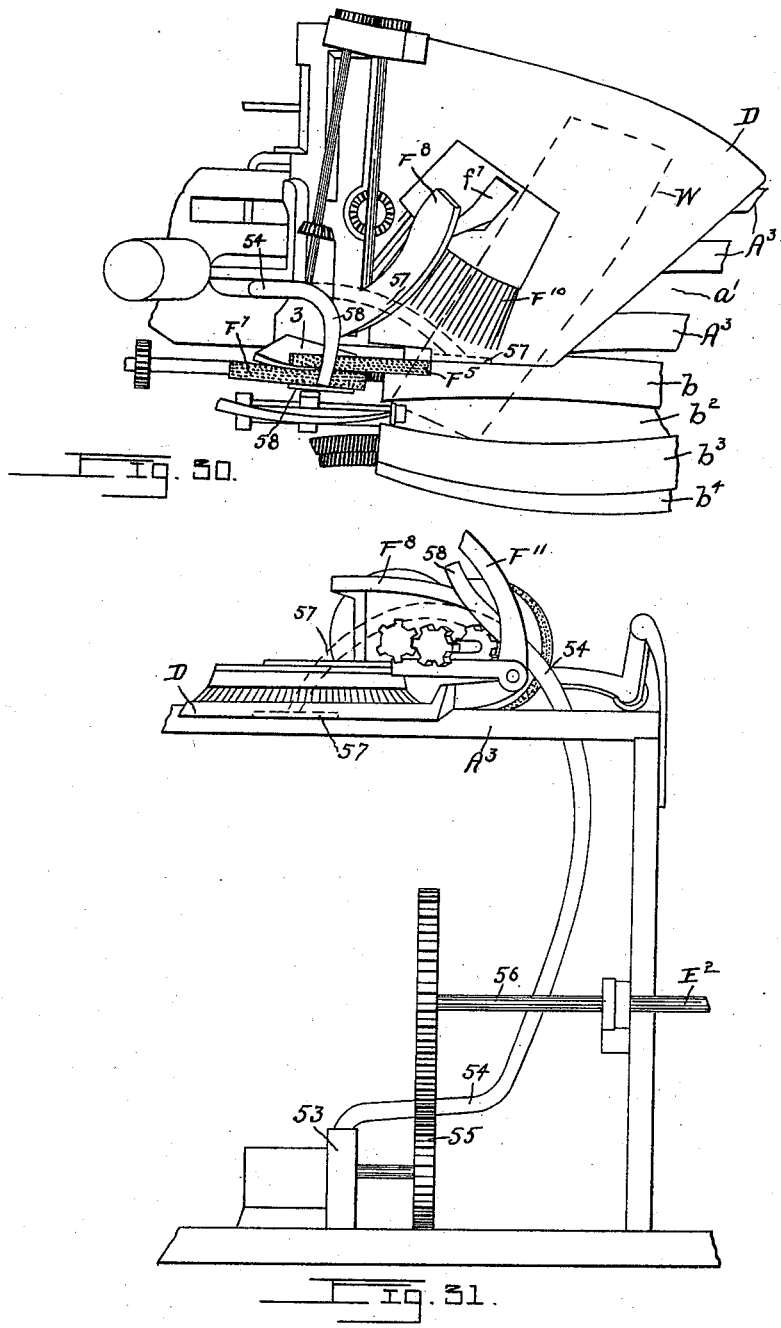

Instead of brushes $F^5$ and $F^7$ a blower 53 of any ordinary construction and a flexible slack tube 54 may be used for spreading the wrapper. This blower is shown in Figs. 30 and 31, Sheet 14. The blower is actuated through a gear 55, connected with an extension 56 of shaft $E^2$ or by any other connection with the operating mechanism of the machine. Tube 54 passes up through slot $a'$ in platform $A^3$ and is carried over plate 3, as shown at 58, or it may be carried over the reciprocating table, as shown by broken lines 57, and have its nozzle located to blow on the wrapper as it passes over the edge of said reciprocating table. This blowing on the leaf is found to be particularly efficacious in spreading the wrapper and taking out of the same all creases and wrinkles. The blower may be used in conjunction with rotary brushes $F^5$ $F^7$; but it is preferably employed alone, its action being more effective than that of said brushes.

In Figs. 24 and 25, Sheet 12, is illustrated a modification of the reciprocating table. In this construction the platform X has pivoted on the top and adjacent to the tuck end thereof, at X', an arm Y. Arm Y passes through a movable channel-plate Z. This channel-plate consists of a U-shaped piece of rigid material having a slot Z' through one end of its closed side adapted to be engaged by arm Y. Arm Y engages between the leaves Z² of channel-plate Z and is pivoted therein on a pin X², secured in said leaves and passing through a curved slot Y' in the stem of said arm. The lower leaf of the channel-plate is rigidly attached to a post X³, extending up through a longitudinal slot X⁴ in platform X and adapted to be moved lengthwise of the same through a connection (not shown) with the operating mechanism of the machine. On the inner edge of the swinging end of arm Y is a wrapper-supporting table Y², and on the back of the arm, opposite said table, are two posts Y³, having hinged therein the arm Y⁴ of a plate Y⁵, carrying a flat brush S, said brush being adapted to be pressed down upon table Y² to hold a wrapper W thereon or to be raised up to permit a wrapper to be put in place on the same. The brush is raised and lowered by means of a handle S'. The parts being in the position shown in Fig. 24, with a wrapper W put in place to be drawn into the roller-pocket and the operation of the machine beginning, post X³, carrying the channel-plate Z, is moved toward the head end of the machine through the slot X⁴ in platform X. This movement, through the engagement of pin X² of said channel-plate and slot Y' of arm Y, draws the vibrating end of the arm Y toward and over platform X, feeding wrapper W to the rollers. The movement of the vibrating end of arm Y is sufficiently rapid to feed the wrapper as it is wound around the filling in the roller-pocket without drawing the same from beneath brush S. In the front edge of channel-plate Z is an angular recess Z³, adapted to receive the adjacent post Y³, supporting the brush-plate, should channel-plate Z be moved far enough to lap said post. Recess Z³ permits the leaves Z² to be made of sufficient width to thoroughly steady arm Y in its movements and at the same time prevents any interference of said post Y³ with the action of channel-plate Z. This manner of leading the head end of the wrapper before or in front of the point at which it is being wrapped around the bunch is continuously changing the angle at which the wrapper is fed to said bunch. The effect of this lead is to prevent the cramping and creasing of the wrapper incident to leading the head end of the wrapper in a line parallel with the axis of the cigar and does automatically what is done by the hands of the cigar-maker when in rolling the wrapper about the bunch he partially unrolls the bunch from the wrapper and changes the angle of the bunch toward the unrolled part of said wrapper, so as to incline said unrolled portion of the wrapper more toward the head of the bunch. This movement is constantly being repeated in the rolling of the wrapper around the bunch of each hand-made cigar.

We do not limit ourselves to the particular construction of the rollers, the means for manipulating the finger, the means for spreading the wrapper as it is drawn into the roller-pocket, the means for automatically holding the head end of the wrapper as the filling is given its final roll or twist therein, and the means for changing the angle at which the wrapper is fed to the filling. Neither do we restrict ourselves to the particular construction and arrangements of other parts of the machine as herein shown and described, as it is obvious that many alterations may be made therein without departing from the spirit and scope of our invention.

Having thus described our invention, what we claim as new, and desire to secure by Letters Patent, is—

1. The combination, in a cigar-machine, of rollers secured in stationary bearings, rocking arms, rollers secured in the vibrating ends of the rocking arms and adapted to form a pocket with the rollers in the stationary bearings, a link adapted to vibrate about a stationary pivot, and a lever pivoted to the vibrating end of said link and to one of the rocking arms, whereby the rocking arms are moved from and toward the rollers in the stationary bearings, for the purpose specified.

2. The combination, in a cigar-machine, of rollers secured in stationary bearings, rocking arms, rollers secured in the vibrating ends of the rocking arms and adapted to form a pocket with the rollers in the stationary bearings, a link adapted to vibrate about a stationary pivot, a lever pivoted to the vibrating ends of said link and to one of the rocking arms, a shoulder on the lever, and a movable arm adapted to engage said shoulder and actuate the rocking arms in one direction, for the purpose specified.

3. The combination, in a cigar-machine, of rollers secured in stationary bearings, rocking arms, rollers secured in the vibrating ends of the rocking arms and adapted to form a pocket with the rollers in the stationary bearings, a link adapted to vibrate about a stationary pivot, a lever pivoted to the vibrating end of said link and to one of the rocking arms, a shoulder on the lever, an arm constructed to automatically engage said shoulder and actuate the rocking arms in one direction, and means for automatically actuating said arms in the opposite direction, for the purpose specified.

4. The combination, in a cigar-machine, of a wrapper-supporting table, means for rolling the wrapper about the fillers, and a brush having a hinge connection with the table and adapted to press a wrapper against the same as said wrapper is drawn from the table, for the purpose specified.

5. The combination, in a cigar-machine, of a wrapper-supporting table, means for rolling the wrapper about the fillers, and a horizontally-adjustable brush having a hinge connection with the table and adapted to press a wrapper against the same as said wrapper is being drawn from the table, for the purpose specified.

6. The combination, in a cigar-machine, of a wrapper-supporting table, means for rolling the wrapper about the fillers, a device adapted to press a wrapper against the table as said wrapper is drawn therefrom, and a blower constructed to spread the wrapper as it is drawn from beneath the spreading device, for the purpose specified.

7. The combination, in a cigar-machine, of a wrapper-supporting table, means for rolling a wrapper about the fillers, a brush having a hinge connection with the table and adapted to press a wrapper against the table as said wrapper is drawn therefrom, and a blower constructed to spread the wrapper as it is drawn from beneath the brush, for the purpose specified.

8. The combination, in a cigar-machine, of a wrapper-supporting table, means for rolling a wrapper about the fillers, a horizontally-adjustable brush having a hinge connection with the table and adapted to press a wrapper against the same as said wrapper is drawn from the table, and a blower constructed to spread the wrapper as it is drawn from beneath the brush, for the purpose specified.

9. The combination, in a cigar-machine, of a reciprocating table, a device for pressing a wrapper against the table as said wrapper is drawn therefrom, means for rolling the wrapper about the fillers, a blower, a slack tube connected with the blower, and a nozzle on the end of said tube and moving with the reciprocating table, the wrapper being spread as it is drawn from beneath said device by the air discharged through said nozzle, for the purpose specified.

10. The combination, in a cigar-machine, of a reciprocating table, a device for pressing a wrapper against the table as said wrapper is drawn therefrom, means for rolling the wrapper about the fillers, a blower, and a slack tube connected with said blower, the nozzle of the tube being located above the edge of the reciprocating table over which the wrapper is drawn and moving with said table, for the purpose specified.

11. The combination, in a cigar-machine, of a reciprocating table, arms hinged to said table, shafts journaled in said arms and transversely of the table and carrying brushes thereon in front of the table, an actuating-gear connecting said shafts, a gear-wheel on one of the shafts, a revoluble shaft disposed longitudinally of the movement of the table and having a longitudinal groove therein, a sleeve on the longitudinally-disposed shaft and having a stud thereon engaging the groove in the shaft, a vertical shaft passing through a bearing in the reciprocating table, a gear on the lower end of the vertical shaft and meshing with a gear on said sleeve, a gear on the upper end of the vertical shaft and meshing with the gear-wheel on one of said shafts disposed transversely of the table, and means for imparting motion to the reciprocating table, all substantially as and for the purpose specified.

12. The combination, in a cigar-machine, of a device adapted to be engaged by a wrapper, a finger hinged to a reciprocating support and having its free end constructed to bear upon said device, means for reciprocating the support, and means for vibrating the free end of the finger, for the purpose specified.

13. The combination, in a cigar-machine, of a revoluble shaft adapted to be lapped by a wrapper, a reciprocating sleeve on the shaft, means for reciprocating the sleeve, a vibrating finger on the sleeve, and means for vibrating the finger, the finger being adapted to press upon the wrapper lapping said shaft, for the purpose specified.

14. The combination, in a cigar-machine, of a cutting-disk adapted to be lapped by a wrapper, a reciprocating and vibrating finger, means for moving the finger toward the cutting-disk and lowering the vibrating end of the finger onto said disk, and means for retracting the finger and raising the vibrating end thereof, for the purpose specified.

15. The combination, in a cigar-machine, of a revoluble shaft having a part thereof in position to be engaged by a wrapper, a rock-shaft, a reciprocating sleeve on the revoluble shaft, a collar on said sleeve and pivoted thereto, an actuating connection between the rock-shaft and said collar, whereby the sleeve is reciprocated and the collar rocked about its pivot, means for actuating the rock-shaft, substantially as described, a finger rigidly secured to the collar, the collar being revolubly connected with the rock-shaft, and means for revolving the finger with the revoluble shaft when the vibrating end of said finger is depressed, for the purpose specified.

16. The combination, in a cigar-machine, of a revoluble shaft having a part thereof in position to be engaged by a wrapper, a reciprocating sleeve on said shaft, a collar on said sleeve and pivoted thereto, substantially as described, a finger rigidly secured to the collar, a rock-shaft having jaws engaging a groove in said collar, whereby said collar is rocked by the rock-shaft, means for reciprocating and rocking the rock-shaft, a shoulder rigidly secured to the revoluble shaft and between the reciprocating sleeve and said part of the shaft in position to be engaged by the wrapper, the finger being adapted to engage said shoulder when the vibrating end thereof is depressed, substantially as and for the purpose specified.

17. The combination, in a cigar-machine, of a revoluble blade, in position to be engaged by a wrapper, a device adapted to be pressed upon said blade, and means for intermittently pressing said device on the blade.

18. The combination, in a cigar-machine, of a revoluble blade, in position to be engaged by an end of a wrapper, an arm, a roller on said arm, and means for automatically actuating said arm to intermittently press the roller on said blade, for the purpose specified.

19. The combination, in a cigar-machine, of a revoluble blade, in position to be engaged by a wrapper, a rib on a revoluble member of the machine, a rock-shaft, an arm on said rock-shaft and adapted to be engaged and raised by said rib, a second arm on said rock-shaft, and a roller on said second arm of the rock-shaft, adapted to be pressed upon said blade when the first-mentioned arm of said rock-shaft is engaged by the rib, substantially as and for the purpose specified.

20. The combination, in a cigar-machine, of a revoluble shaft having a circular blade located in position to be engaged by a wrapper, a reciprocating and vibrating finger adapted to hold the end of the wrapper on said blade, means for reciprocating and vibrating said finger, a device adapted to be pressed upon said blade after the finger is retracted therefrom, and means for raising said device from the blade, for the purpose specified.

21. The combination, in a cigar-machine, of cigar-rolling devices forming a pocket, a revoluble blade located adjacent to an end of said pocket, a wrapper-supporting table, means for reciprocating said table lengthwise of the pocket, a frame hinged on said table, a device on said frame adapted to press a wrapper against the table while said wrapper is being drawn into the pocket, a reciprocating and vibrating finger constructed to hold the wrapper on said blade, and a gear connecting said table-frame and the finger, whereby the lowering of said frame causes the finger to be moved toward the blade, for the purpose specified.

22. The combination, in a cigar-machine, of cigar-rolling devices forming a pocket, a revoluble blade located adjacent to an end of said pocket, a wrapper-supporting table, means for reciprocating said table lengthwise of the pocket, a device on said frame adapted to press a wrapper against the table while said wrapper is being drawn into the pocket, a reciprocating and vibrating finger constructed to hold the wrapper on said blade, a gear connecting said table-frame and the finger, whereby the lowering of said frame causes the finger to be moved toward the blade, means for retracting the finger, a device adapted to be pressed upon said blade after the finger is retracted, and means for operating said pressing device, for the purpose specified.

23. The combination, in a cigar-machine, of a shaft, a reciprocating sleeve on said shaft, a vibrating finger having a hinge connection with the reciprocating sleeve, a post having an end adapted to rock lengthwise of said shaft, means for rocking said end of the post, a connection between the rocking end of the post and the sleeve, the sleeve being reciprocated through said connection, and means for vibrating the finger, for the purpose specified.

24. The combination, in a cigar-machine, of a shaft, a reciprocating sleeve on said shaft, a vibrating finger connected with the reciprocating sleeve, a post having an end adapted to rock lengthwise of said shaft, an operating connection between the rocking end of said post and the reciprocating sleeve, a rock-shaft, means for actuating the rock-shaft, and an arm on the rock-shaft and pivoted to an arm connected with the rocking end of said post, whereby motion is imparted to said rocking end of the post and the finger is vibrated, for the purpose specified.

25. The combination, in a cigar-machine, of a shaft, a reciprocating sleeve on said shaft, a vibrating finger connected with the reciprocating sleeve, a post having an end adapted to rock lengthwise of said shaft, an operating connection between the rocking end of said post and the reciprocating sleeve, a rock-shaft, an arm on the rock-shaft pivoted to an arm connected with the rocking end of said post, whereby motion is imparted to said rocking end of the post and the finger is vibrated, a wrapper-supporting table, a lip on the rock-shaft, a device adapted to be lowered to press the wrapper against said table, and an arm on said device, constructed to engage said lip and actuate the rock-shaft when said device is lowered onto the table, for the purpose specified.

26. The combination, in a cigar-machine, of a shaft, a pivoted collar connected with the shaft, a finger on the collar, a rocking post, a rock-shaft in the vibrating end of the rocking post, a connection between the rock-shaft and said collar, whereby the collar is actuated about its pivot, a pin-wheel, a rock-shaft carrying a rock-bar, a lip connected with the vibrating end of the rock-bar and adapted to be interposed in the path of travel of a pin on the pin-wheel, an arm on the rock-shaft carrying the rock-bar, and a rod connecting said arm and an arm on the rock-shaft journaled in the rocking post, for the purpose specified.

27. The combination, in a cigar-machine, of a shaft, a reciprocating sleeve on the shaft, a collar pivoted on the sleeve, a finger on the collar, a rocking post, a rock-shaft in the vibrating end of the rocking post, a connection between said rock-shaft and said collar, whereby the collar is rotated and the reciprocating sleeve actuated, a rock-shaft journaled in stationary bearings, an arm on the rock-shaft journaled in the stationary bearings, said arm being pivoted to an arm connected with the vibrating end of the rocking post, a pin-wheel, a rock-shaft carrying a rock-bar, a lip connected with the vibrating end of the rock-bar and adapted to be interposed in the path of travel of a pin on the pin-wheel, an arm on the rock-shaft carrying the rock-bar, and a rod connecting said arm and an arm of the rock-shaft journaled in the rocking post, for the purpose specified.

28. The combination, with a pinion having jaws thereon, of a gear-wheel meshing with the pinion and having a toothless segment in the periphery thereof, reciprocating jaws on the gear-wheel, adapted to work in line with said toothless segment and constructed to engage the jaws on the pinion, a boss having a slot engaged by the shaft carrying said gear-wheel, a collar on said boss, a rigid connection between said collar and the jaws on the gear-wheel, a pin-wheel, a rock-bar, a lever on the vibrating end of the rock-bar, a lip on each of the arms of said lever and adapted to engage pins on the pin-wheel, a rod connecting the rock-bar and the boss on the gear-wheel shaft, a rock-shaft having an arm thereon, a rod connecting the arm on the rock-shaft and an arm of the lever on the rock-bar, means for rotating said rock-shaft in one direction, and means for vibrating the arm on said rock-shaft in an opposite direction, for the purpose specified.

29. The combination, in a cigar-machine, of mechanism for rolling a wrapper about the filling of a cigar, a device for holding the head end of the wrapper while the final turn or twist of the head of said filling is being made in the wrapper, and mechanism for automatically severing the end of the wrapper held by said device from the part of the wrapper applied to the filling of the cigar, for the purpose specified.

30. The combination, in a cigar-machine, of means for rolling a wrapper about the filling of the cigar, jaws adjacent to the head end of the cigar, and a device adapted to actuate said jaws to automatically grasp the wrapper and hold the same while the final turn of the wrapper about the head of the cigar is being made.

31. The combination, in a cigar-machine, of means for rolling a wrapper about the filling of the cigar, levers adjacent to the part of the mechanism at which the head end of the cigar is formed, jaws adapted to grasp the wrapper and hold the same while the final turn of the wrapper about the head of the cigar is being made, and connections between the levers and said jaws, whereby the jaws are actuated.

32. The combination, in a cigar-machine, of means for rolling a wrapper about the filling of the cigar, levers adjacent to the part of the mechanism at which the head of the cigar is formed, jaws pivoted between the levers, shoulders on the levers adapted to engage shoulders on the jaws, whereby the jaws are closed upon the wrapper and hold the same while the final turn of the wrapper about the head of the cigar is being made, and a spring coiled around a pin and having the arms thereof engaging shoulders on the jaws, to separate the same.

33. The combination, in a cigar-machine, of means for rolling a wrapper about the filling of the cigar, jaws adjacent to the mechanism at which the head of the cigar is formed and adapted to grasp the wrapper and hold the same while the final turn of the wrapper about the head of the cigar is being made, a blade, and mechanism for passing the blade between said jaws and the head of the cigar, to sever the surplus from the head end of the wrapper.

34. The combination, in a cigar-machine, of means for rolling a wrapper about the filling of a cigar, levers adjacent to the part of the mechanism at which the head of the cigar is formed, jaws pivoted between the levers, shoulders adapted to engage shoulders on the jaws and close said jaws upon the wrapper, heads on the levers, and a blade in one of said heads, said blade being adapted to sever the surplus from the head end of the wrapper after the final turn of the wrapper is made around the head of the cigar.

35. The combination, in a cigar-machine, of means for rolling a wrapper about the filling of a cigar, a lever adapted to vibrate adjacent to the part of the mechanism at which the head of the cigar is formed, a head having a recess in the front thereof and located in a recess in said lever, the stem of the head being pivotally connected with the lever, and a spring bearing on the back of said head, the recess in the head being adapted to engage the head of a cigar, substantially as and for the purpose specified.

36. The combination, in a cigar-machine, of means for rolling a wrapper about the filling of a cigar, jaws adjacent to the head end of the cigar and adapted to grasp the wrapper and hold the same while the final turn of the wrapper about the head of the cigar is being made, levers having recesses in the heads thereof, said recesses being constructed to embrace and form the head of the cigar, and means for actuating the jaws and the levers.

37. The combination, in a cigar-machine, of means for rolling a wrapper about the filling of a cigar, levers, heads on the levers and having recesses therein, said recesses being constructed to embrace and form the head of a cigar, jaws located outside of said lever-heads and adapted to grasp the wrapper and hold the same while the final turn of the wrapper is being made about the head of the cigar, and a blade in one of said lever-heads, said blade being adapted to sever the surplus from the head end of the wrapper after the final turn of the wrapper is made around the head of the cigar, and means for actuating said levers and the jaws.

38. The combination, in a cigar-machine, of means for rolling a wrapper about the filling of a cigar, a lever adjacent to the part of the mechanism in which the head of the cigar is formed, a head having a recess in the front thereof and located in a recess in said lever, the stem of the head being pivotally connected with the lever, a spring bearing on the back of said head, the recess in said head being adapted to engage the head of a cigar, jaws located outside of the head of said lever and adapted to grasp the wrapper and hold the same while the final turn of the wrapper is being made about the head of the cigar, a blade in the head of said lever, said blade being adapted to sever the surplus from the head end of the wrapper after the final turn of the wrapper is made around the head of the cigar, and means for actuating the lever and said jaws.

39. The combination, in a cigar-machine, of means for rolling a wrapper about the filling of a cigar, levers adjacent to the part of the mechanism in which the head of the cigar is formed, a head having a recess in the front thereof and located in a recess in one of the levers, the stem of the head being pivotally connected with said lever, a spring bearing on the back of the head, the recess in said head being adapted to register with a recess in the other lever, said united recesses embracing the head of the cigar, jaws located outside of the levers, for the purpose described, a blade in the head of one of said levers, adapted to be interposed between said jaws and the united recesses of the lever-heads, and means for actuating the levers and said jaws, for the purpose specified.

40. The combination, in a cigar-machine, of means for rolling a wrapper about the filling of a cigar, levers having recesses in which the head of a cigar is formed, jaws adapted to automatically grasp the head end of the wrapper, a blade on one of the lever-heads and constructed to be interposed between said jaws and the portions of the lever-heads having said recesses therein, means for applying paste to the head end of the wrapper, and means for actuating said jaws and the levers, for the purpose specified.

41. The combination, in a cigar-machine, of means for rolling a wrapper about the filling of a cigar, levers having recesses in which the head of a cigar is formed, jaws adapted to automatically grasp the head end of the wrapper, a blade on one of the lever-heads and constructed to be interposed between said jaws and the portions of the lever-heads having said recesses therein, means for automatically applying a paste-brush beneath said blade and to the head of the wrapper, and means for automatically actuating said jaws and the levers, for the purpose specified.

42. The combination, in a cigar-machine, of means for rolling a wrapper about the filling of a cigar, levers having recesses in which the head of a cigar is formed, a rack, a paste-box, a rock-shaft journaled in bearings in one of said levers, a pinion on the rock-shaft and meshing with the rack, an arm on the rock-shaft, a paste-brush attached to said arm, and means for actuating the levers, substantially as and for the purpose specified.

43. The combination, in a cigar-machine, of rollers having supports, rocking arms, rollers supported in said arms and adapted to form a pocket with the rollers in the fixed supports, a shoulder connected with the rocking arms, a reciprocating table, a frame hinged to said table, a device attached to the frame and adapted to press a wrapper against the table while said wrapper is being drawn into the roller-pocket, an arm rigidly connected with said frame and depending below the platform on which the table moves, a rotating shaft, mechanism for imparting intermittent motion to said shaft, a rock-shaft, a tripping-arm on the rock-shaft, adapted to engage the arm on the table-frame and elevate said frame, a lip on the rock-shaft, an arm on the intermittently-rotating shaft and adapted to successively engage the lip on the rock-shaft, to actuate the tripping-arm, and the shoulder connected with the rocking arms to open the rollers carried thereby from the rollers in the fixed supports, mechanism actuated by the intermittently-rotating shaft and adapted to finish the head of a cigar, means for automatically depressing said frame onto the reciprocating table, and means for automatically closing the rocking arms toward the rollers in the fixed supports, substantially as and for the purpose specified.

44. The combination, in a cigar-machine, of mechanism for rolling a wrapper about the filling of a cigar, a platform having a slot therein, a pivoted arm having a slot therein, a wrapper-carrying table on the swinging end of the arm, a pin engaging the slot in said arm, and a connection between said pin and the actuating mechanism and passing through the slot in the platform, for the purpose specified.

45. The combination, in a cigar-machine, of mechanism for rolling a wrapper about the filling of a cigar, a platform having a slot therein parallel with the axis of said mechanism, a U-shaped channel-plate on the platform, a post passing through the slot in the platform and connecting the channel-plate and the actuating mechanism, a pivoted arm passing between the leaves of the channel-plate and having an inwardly-curved slot therein, a pin between the leaves of the channel-plate and engaging the slot in said arm, a wrapper-carrying table on the swinging end of the arm, and means for pressing a wrapper against said table as said wrapper is drawn therefrom, substantially as and for the purpose specified.

BENJAMIN H. SNAVELY.
THOMAS H. KELLER.

Witnesses:
C. G. BASSLER,
WM. R. GERHART.